US 6,583,752 B2

(12) United States Patent
Samukawa et al.

(10) Patent No.: US 6,583,752 B2
(45) Date of Patent: Jun. 24, 2003

(54) METHOD AND APPARATUS FOR RECOGNIZING OBJECT

(75) Inventors: Yoshie Samukawa, Kariya (JP); Keiji Matsuoka, Kariya (JP); Hiroshi Ookata, Kariya (JP); Toyohito Nozawa, Kariya (JP); Noriaki Shirai, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/880,776

(22) Filed: Jun. 15, 2001

(65) Prior Publication Data
US 2002/0003489 A1 Jan. 10, 2002

(30) Foreign Application Priority Data
Jul. 10, 2000 (JP) ........................................ 2000-208561

(51) Int. Cl.⁷ ............................................... G01S 13/93
(52) U.S. Cl. .............................. 342/70; 342/27; 342/28; 342/52; 342/54; 342/71; 701/300; 701/301
(58) Field of Search ............................... 342/70, 71, 72, 342/175, 195, 27, 28, 52, 53, 54, 55, 56, 89, 90; 701/300, 301, 302

(56) References Cited

U.S. PATENT DOCUMENTS 5,510,990 A * 4/1996 Hibino et al. ............... 701/300
5,574,463 A   11/1996 Shirai et al.
5,612,699 A * 3/1997 Yamada ....................... 342/70
5,710,565 A   1/1998 Shirai et al.
5,793,325 A * 8/1998 Yamada ....................... 342/70
5,955,967 A * 9/1999 Yamada ....................... 342/70
6,380,883 B1 * 4/2002 Bell et al. .................... 342/70

FOREIGN PATENT DOCUMENTS

| EP | 0726473 A2 * | 8/1996 | ........... G01S/13/93 |
| EP | 1065520 A2 * | 1/2001 | ........... G01S/13/93 |
| JP | 8-240660 A   | 9/1996 | |
| JP | 9-15331 A    | 1/1997 | |
| JP | 11-337636 A  | 12/1999 | |

* cited by examiner

Primary Examiner—Bernarr E. Gregory
(74) Attorney, Agent, or Firm—Posz & Bethards, PLC

(57) ABSTRACT

A transmission wave is applied to a predetermined range in a width-wise direction of a vehicle. Objects ahead of the vehicle are recognized on the basis of reflected waves resulting from reflections of the transmission wave. Calculation is made as to a position of each of the objects and also a lane-sameness probability for each of the objects that the object and the subject vehicle are on a same lane. Object information pieces corresponding to the respective objects represent the calculated positions of the objects and the calculated lane-sameness probabilities for the objects. In cases where at least two objects become substantially equal in position, the two objects are recognized as a single object. One is selected from the two objects which relates to a calculated lane-sameness probability equal to or higher than a predetermined value. The single object takes over an object information piece corresponding to the selected object.

16 Claims, 9 Drawing Sheets

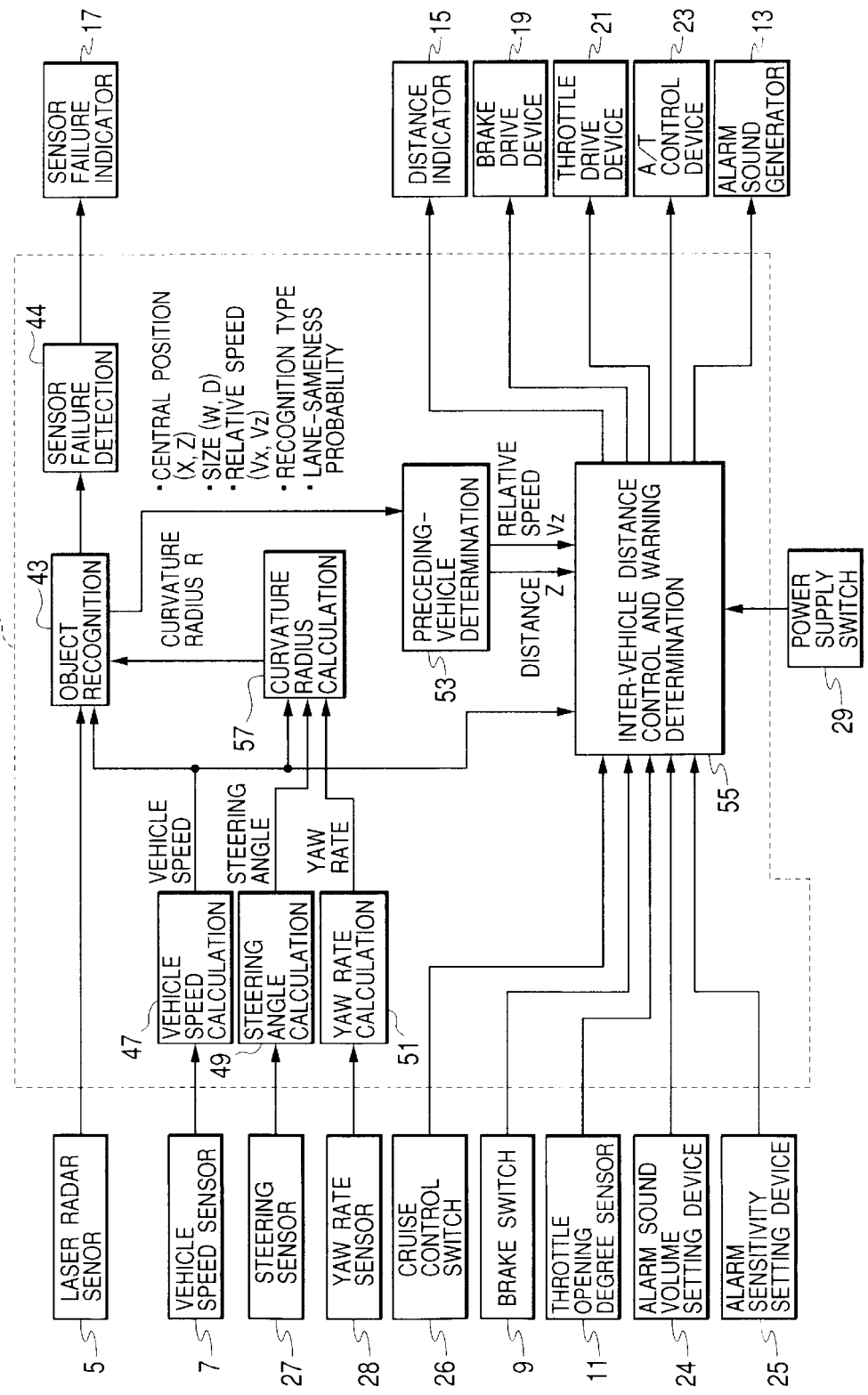

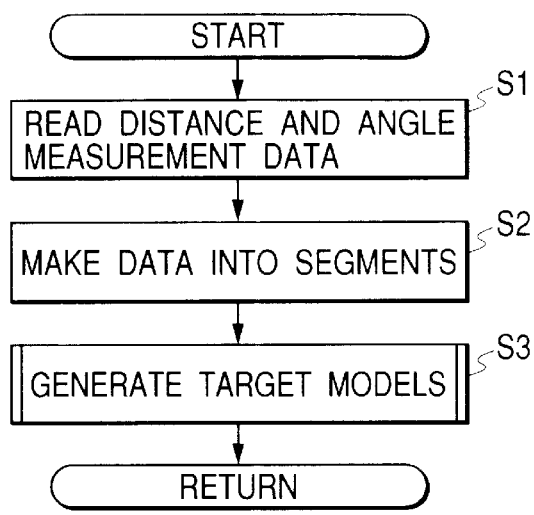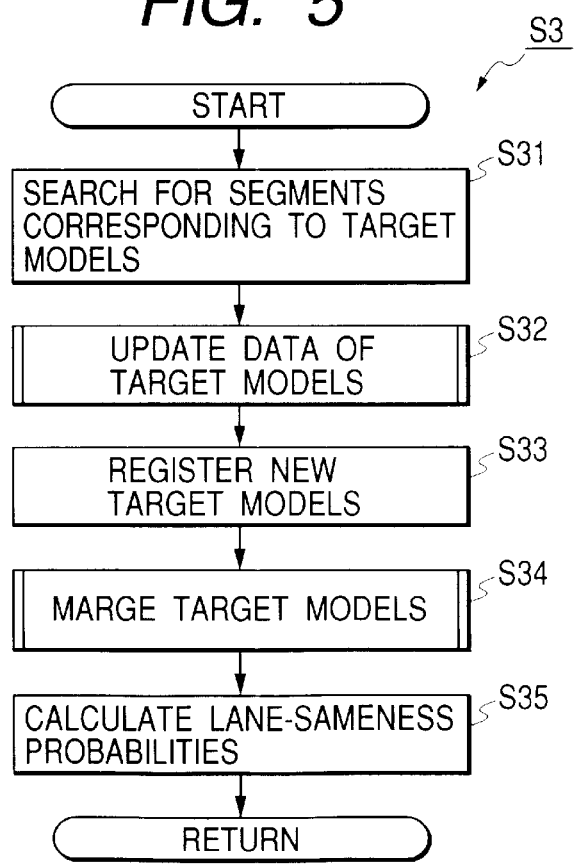

A : PAST OBJECT (TARGET MODEL A)
Az : NEXT ESTIMATED DISTANCE OF TARGET MODEL A
B : PAST OBJECT (TARGET MODEL B)
Bz : NEXT ESTIMATED DISTANCE OF TARGET MODEL B

C : COMBINATION-RESULT OBJECT
Cz : CURRENT DISTANCE

METHOD AND APPARATUS FOR RECOGNIZING OBJECT

BACKGROUND OF THE INVENTION

1. Field of the Invention

This invention relates to a method of recognizing an object. In addition, this invention relates to an apparatus for recognizing an object which can be mounted on a vehicle. Furthermore, this invention relates to a recording medium storing a computer program for recognizing an object.

2. Description of the Related Art

A known object recognition apparatus for a vehicle emits a forward wave beam such as a light beam or a millimeter wave beam from the body of the vehicle, and enables the forward wave beam to scan a given angular region in front of the body of the vehicle. In the case where an object exists in the given angular region, the forward wave beam encounters the object before being at least partially reflected thereby. A portion of the reflected wave beam returns to the apparatus as an echo wave beam. The apparatus detects and recognizes the object in response to the echo wave beam.

The known object recognition apparatus is used in a warning system for a vehicle which alarms when an obstacle such as a preceding vehicle exists in a given angular region in front of the present vehicle. The known object recognition apparatus is used also in a system for a vehicle which controls the speed of the vehicle to maintain a proper distance between the vehicle and a preceding vehicle.

Japanese patent application publication number 8-240660 discloses an on-vehicle apparatus for recognizing objects. The apparatus in Japanese application 8-240660 includes a distance sensor mounted on the present vehicle which detects the longitudinal-direction and transverse-direction distances to objects from the present vehicle. The distance sensor generates detection data having pieces representing distances to objects respectively. The distances to the objects mean positions of the objects relative to the present vehicle. In the apparatus of Japanese application 8-240660, pieces of detection data which correspond to object positions close to each other and in a first prescribed mutual-distance range are collected into a block having a block label. Generally, there are a plurality of blocks. Speeds relative to the present vehicle and corresponding to respective blocks are calculated. Blocks which correspond to positions in a second prescribed mutual-distance range, and which correspond to speeds in a preset speed-difference range are collected into a group having a group label. Finally, an object is recognized from detection data pieces representing a group.

Japanese patent application publication number 11-337636 discloses a rear monitoring system for a vehicle. In the system of Japanese application 11-337636, a rear sensor outputs a plurality of wave motions for detection from the rear of one's own vehicle toward different regions, and captures the reflected waves in response to each of the wave motions. The location of a wave motion reflecting point in the rear of one's own vehicle is detected, and an object in the rear of one's own vehicle is discriminated by an object discriminating means on the basis of the continuity of information on the location of a wave motion reflecting point. Then, the relative speed of the object discriminated by the object discriminating means with respect to one's own vehicle is computed by deciding means. On the basis of the relative speed, it is determined whether or not the object is an approaching object. When there are a plurality of discriminated objects at this time, the distance between the two objects is compared with a reference distance obtained by multiplying the speed of one's own vehicle by a predetermined time. When the distance between the two objects is equal to or less than the reference distance, the two objects are decided to be the one and the same object. Thus, in this case, the two objects are recognized as a single object at the object discriminating means.

Japanese patent application publication number 9-15331 discloses an on-vehicle apparatus for detecting an object. The apparatus in Japanese application 9-15331 includes a distance sensor which detects a distance between its own vehicle and an object by transmission and reception of laser light. Output data from the distance sensor are developed by a coordinate development means on the X-Y coordinates for which the longitudinal direction from the own vehicle is taken as the Y axis and the lateral direction as the X axis. A cell forming means which provides a plurality of cells divided at prescribed intervals in the directions of the X and Y axes sets the developed data on the cells, and outputs the X-Y coordinates and the number of the data of each cell as cell information. Based on this information, an object discriminating means attaches the same label to the cells near to each other, and discriminates a plurality of cells as the same object. Then, a setting number of data being closer in the distance in the longitudinal direction are selected out of the cell data corresponding to the same object, and the longitudinal-direction distances corresponding to the selected data are averaged into a mean value. The mean value is used as an indication of the distance in the longitudinal direction from the own vehicle to the object.

U.S. Pat. No. 5,710,565 discloses an inter-vehicle distance control system which includes a laser scanning type distance sensor for moving a laser beam in a width-wise direction of a system vehicle to implement scanning and to determine relative positions and relative angles of objects within a forward detectable zone. A determination is made as to same lane probabilities that the objects exist in the same lane of a road as the system vehicle on the basis of a variable probability distribution and the relative positions and the relative angles of the objets. A target preceding vehicle is selected from the objects on the basis of the same lane probabilities. Information of the target preceding vehicle is used in controlling the speed of the system vehicle to keep constant the distance to the target preceding vehicle.

U.S. Pat. No. 5,574,463 discloses an obstacle recognition system for a vehicle which includes a radar device for emitting a wave beam into a given angular range outside a vehicle, and scanning the given angular range by the wave beam. The radar device detects a reflected wave beam. A recognizing device is operative for recognizing an obstacle with respect to the vehicle on the basis of the result of detection of the reflected wave beam by the radar device. In the recognizing device, a point recognizing section recognizes obstacles as points, and a uniting section is operative for uniting adjacent points among the points provided by the point recognizing section. The uniting section provides sets each having adjacent points. A line-segment recognizing section is operative for detecting a specific set or specific sets of adjacent points among the adjacent-point sets provided by the uniting section, and for recognizing every detected specific set as a line segment having a length only along a width direction of the vehicle. Every specific set has a length smaller than a given length along a longitudinal direction of the vehicle. A position estimating section estimates the position of a line segment, which will be provided by the line-segment recognizing section, in response to the position of a previously-provided line segment. An identity judging section is operative for comparing the line-segment position estimated by the position estimating section and the position of a line segment currently provided by the line-segment recognizing section to judge whether or not the line segment currently provided by the line-segment recognizing section and the previously-provided line segment are the same.

It is known to use target models in object recognition for a vehicle. In some cases, there simultaneously occur a correct target model and a wrong target model as a result of recognition concerning one object. The wrong target model is caused by, for example, noise. Generally, every target model has object information. An example of the object information includes a piece representing the center position of an object, a piece representing the size of the object, and a piece representing the speed of the object relative to the vehicle. When two target models become positionally coincident with each other, one of them is selected as an effective target model and the other is deleted. Thus, only the object information related to the selected target model continues to be effective. An example of conditions of the selection is as follows. Measurement is given of a first time interval during which a first target model is continuously detected, and a second time interval during which a second target model is continuously detected. In the case where the first and second target models become positionally coincident with each other, the first and second measured time intervals are compared with each other to decide which of them is longer (or which of them is shorter). Then, one of the first and second target models which corresponds to the longer measured time interval is selected as an effective target model. This selection is based on the idea that one of the first and second target models which corresponds to the longer measured time interval agrees with a correct target model while the other agrees with a wrong target model.

There is a chance that under certain circumstances, one of the first and second target models which corresponds to the shorter measured time interval agrees with a correct target model while the other agrees with a wrong target model. In these circumstances, the correct target model is deleted, and the wrong target model is selected. The deletion of the correct target model reduces the accuracy of object recognition.

SUMMARY OF THE INVENTION

It is a first object of this invention to provide a method of accurately recognizing an object.

It is a second object of this invention to provide an apparatus for accurately recognizing an object.

It is a third object of this invention to provide a recording medium storing a computer program for accurately recognizing an object.

A first aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of calculating positions of the objects; calculating a lane-sameness probability for each of the objects that the object and the subject vehicle are on a same lane; generating object information pieces corresponding to the objects respectively, the object information pieces representing the calculated positions of the objects and the calculated lane-sameness probabilities for the objects; determining whether or not at least two objects among the objects become substantially equal in position; in cases where it is determined that at least two objects become substantially equal in position, recognizing the at least two objects as a single object; selecting one from the at least two objects which relates to a calculated lane-sameness probability equal to or higher than a predetermined value; and causing said single object to take over an object information piece corresponding to the selected object.

A second aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of calculating positions of the objects; determining whether or not a recognition state of each of the objects is stable; generating object information pieces corresponding to the objects respectively, the object information pieces representing the calculated positions of the objects and whether or not the recognition states of the objects are stable; determining whether or not at least two objects among the objects become substantially equal in position; in cases where it is determined that at least two objects become substantially equal in position, recognizing the at least two objects as a single object; selecting one from the at least two objects whose recognition state is determined to be stable; and causing said single object to take over the object information piece corresponding to the selected object.

A third aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of periodically calculating positions of the objects; estimating current positions of the objects on the basis of previously calculated positions thereof; calculating deviations between the estimated current positions of the objects and currently calculated positions thereof; generating object information pieces corresponding to the objects respectively, the object information pieces representing the calculated positions of the objects and the calculated deviations related to the objects; determining whether or not at least two objects among the objects become substantially equal in position; in cases where it is determined that at least two objects become substantially equal in position, recognizing the at least two objects as a single object; selecting one from the at least two objects which relates to a smallest calculated deviation; and causing said single object to take over the object information piece corresponding to the selected object.

A fourth aspect of this invention provides an object recognition apparatus comprising radar means for applying a transmission wave to a predetermined range in a width-wise direction of a subject vehicle, and detecting objects on the basis of reflected waves which result from reflections of the transmission wave; and recognizing means for recognizing objects located ahead of the subject vehicle on the basis of results of detection by the radar means. The recognizing means comprises 1) first means for calculating positions of the recognized objects; 2) second means for calculating a lane-sameness probability for each of the recognized objects that the object and the subject vehicle are on a same lane; 3) third means for generating object information pieces corresponding to the recognized objects respectively, the object information pieces representing the calculated positions of the recognized objects and the calculated lane-sameness probabilities for the recognized objects; 4) fourth means for determining whether or not at least two objects among the recognized objects become substantially equal in position; 5) fifth means for, in cases where the fourth means determines that at least two objects become substantially equal in position, recognizing the at least two objects as a single object; 6) sixth means for selecting one from the at least two objects which relates to a calculated lane-sameness probability equal to or higher than a predetermined value; and 7) seventh means for causing said single object to take over an object information piece corresponding to the object selected by the sixth means.

A fifth aspect of this invention provides an object recognition apparatus comprising radar means for applying a transmission wave to a predetermined range in a width-wise direction of a subject vehicle, and detecting objects on the basis of reflected waves which result from reflections of the transmission wave; and recognizing means for recognizing objects located ahead of the subject vehicle on the basis of results of detection by the radar means. The recognizing means comprises 1) first means for calculating positions of the recognized objects; 2) second means for determining whether or not a recognition state of each of the recognized objects is stable; 3) third means for generating object information pieces corresponding to the recognized objects respectively, the object information pieces representing the calculated positions of the recognized objects and whether or not the recognition states of the recognized objects are stable; 4) fourth means for determining whether or not at least two objects among the recognized objects become substantially equal in position; 5) fifth means for, in cases where the fourth means determines that at least two objects become substantially equal in position, recognizing the at least two objects as a single object; 6) sixth means for selecting one from the at least two objects whose recognition state is determined to be stable; and 7) seventh means for causing said single object to take over the object information piece corresponding to the object selected by the sixth means.

A sixth aspect of this invention provides an object recognition apparatus comprising radar means for applying a transmission wave to a predetermined range in a width-wise direction of a subject vehicle, and detecting objects on the basis of reflected waves which result from reflections of the transmission wave; and recognizing means for recognizing objects located ahead of the subject vehicle on the basis of results of detection by the radar means. The recognizing means comprises 1) first means for periodically calculating positions of the recognized objects; 2) second means for estimating current positions of the recognized objects on the basis of previously calculated positions thereof; 3) third means for calculating deviations between the estimated current positions of the recognized objects and currently calculated positions thereof; 4) fourth means for generating object information pieces corresponding to the recognized objects respectively, the object information pieces representing the calculated positions of the recognized objects and the calculated deviations related to the recognized objects; 5) fifth means for determining whether or not at least two objects among the recognized objects become substantially equal in position; 6) sixth means for, in cases where the fifth means determines that at least two objects become substantially equal in position, recognizing the at least two objects as a single object; 7) seventh means for selecting one from the at least two objects which relates to a smallest calculated deviation; and 8) eighth means for causing said single object to take over the object information piece corresponding to the object selected by the seventh means.

A seventh aspect of this invention is based on the fourth aspect thereof, and provides an object recognition apparatus wherein the recognizing means further comprises eighth means for determining whether or not a recognition state of each of the recognized objects is stable; ninth means for adding results of the determining by the eighth means to the object information pieces; tenth means for, either in cases where a plurality of objects among the at least two objects relate to calculated lane-sameness probabilities equal to or higher than the predetermined value or in cases where a plurality of objects among the at least two objects relate to calculated lane-sameness probabilities less than the predetermined value, selecting one from the at least two objects whose recognition state is determined to be stable; and eleventh means for causing said single object to take over the object information piece corresponding to the object selected by the tenth means.

An eighth aspect of this invention is based on the fourth aspect thereof, and provides an object recognition apparatus wherein the recognizing means further comprises eighth means for estimating current positions of the recognized objects on the basis of previously calculated positions thereof; ninth means for calculating deviations between the estimated current positions of the recognized objects and currently calculated positions thereof; tenth means for adding the deviations calculated by the ninth means to the object information pieces; eleventh means for, either in cases where a plurality of objects among the at least two objects relate to calculated lane-sameness probabilities equal to or higher than the predetermined value or in cases where a plurality of objects among the at least two objects relate to calculated lane-sameness probabilities less than the predetermined value, selecting one from the at least two objects which relates to a smallest calculated deviation; and twelfth means for causing said single object to take over the object information piece corresponding to the object selected by the eleventh means.

A ninth aspect of this invention is based on the fourth aspect thereof, and provides an object recognition apparatus wherein the recognizing means further comprises eighth means for determining whether or not a recognition state of each of the recognized objects is stable; ninth means for adding results of the determining by the eighth means to the object information pieces; tenth means for estimating current positions of the recognized objects on the basis of previously calculated positions thereof; eleventh means for calculating deviations between the estimated current positions of the recognized objects and currently calculated positions thereof; twelfth means for adding the deviations calculated by the eleventh means to the object information pieces; thirteenth means for, either in cases where a plurality of objects among the at least two objects relate to calculated lane-sameness probabilities equal to or higher than the predetermined value and only one of the at least two objects has a recognition state determined to be stable or in cases where a plurality of objects among the at least two objects relate to calculated lane-sameness probabilities less than the predetermined value and only one of the at least two objects has a recognition state determined to be stable, selecting one from the at least two objects whose recognition state is determined to be stable; fourteenth means for causing said single object to take over the object information piece corresponding to the object selected by the thirteenth means; fifteenth means for, either in cases where a plurality of objects among the at least two objects relate to calculated lane-sameness probabilities equal to or higher than the predetermined value and two or more of the at least two objects have recognition states determined to be stable or in cases where a plurality of objects among the at least two objects relate to calculated lane-sameness probabilities less than the predetermined value and two or more of the at least two objects have recognition states determined to be stable, selecting one from the at least two objects which relates to a smallest calculated deviation; and sixteenth means for causing said single object to take over the object information piece corresponding to the object selected by the fifteenth means.

A tenth aspect of this invention is based on the fifth aspect thereof, and provides an object recognition apparatus wherein the recognizing means further comprises eighth means for estimating current positions of the recognized objects on the basis of previously calculated positions thereof; ninth means for calculating deviations between the estimated current positions of the recognized objects and currently calculated positions thereof; tenth means for adding the deviations calculated by the ninth means to the object information pieces; eleventh means for, either in cases where a plurality of objects among the at least two objects relate to calculated lane-sameness probabilities equal to or higher than the predetermined value and two or more of the at least two objects have recognition states determined to be stable or in cases where a plurality of objects among the at least two objects relate to calculated lane-sameness probabilities less than the predetermined value and two or more of the at least two objects have recognition states determined to be stable, selecting one from the at least two objects which relates to a smallest calculated deviation; and twelfth means for causing said single object to take over the object information piece corresponding to the object selected by the eleventh means.

An eleventh aspect of this invention is based on the fifth aspect thereof, and provides an object recognition apparatus wherein the second means in the recognizing means comprises means for calculating an acceleration of each of the recognized objects relative to the subject vehicle, means for judging whether or not the calculated acceleration is in a predetermined range hardly occurring under usual traffic conditions, means for, when the calculated acceleration is judged to be in the predetermined range, determining that a recognition state of the related object is not stable, and means for, when the calculated acceleration is judged to be not in the predetermined range, determining that a recognition state of the related object is stable.

A twelfth aspect of this invention provides a recording medium storing a program for controlling a computer operating as the recognizing means in the object recognition apparatus of the fourth aspect of this invention.

BRIEF DESCRIPTION OF THE DRAWINGS

FIG. 2 is an operation flow diagram of an electronic control unit (ECU) in FIG. 1.

FIG. 3 is a flowchart of a portion of a program for the ECU in FIG. 1.

FIG. 5 is a flowchart of a block in FIG. 3.

DETAILED DESCRIPTION OF THE INVENTION

First Embodiment

Figure 1:
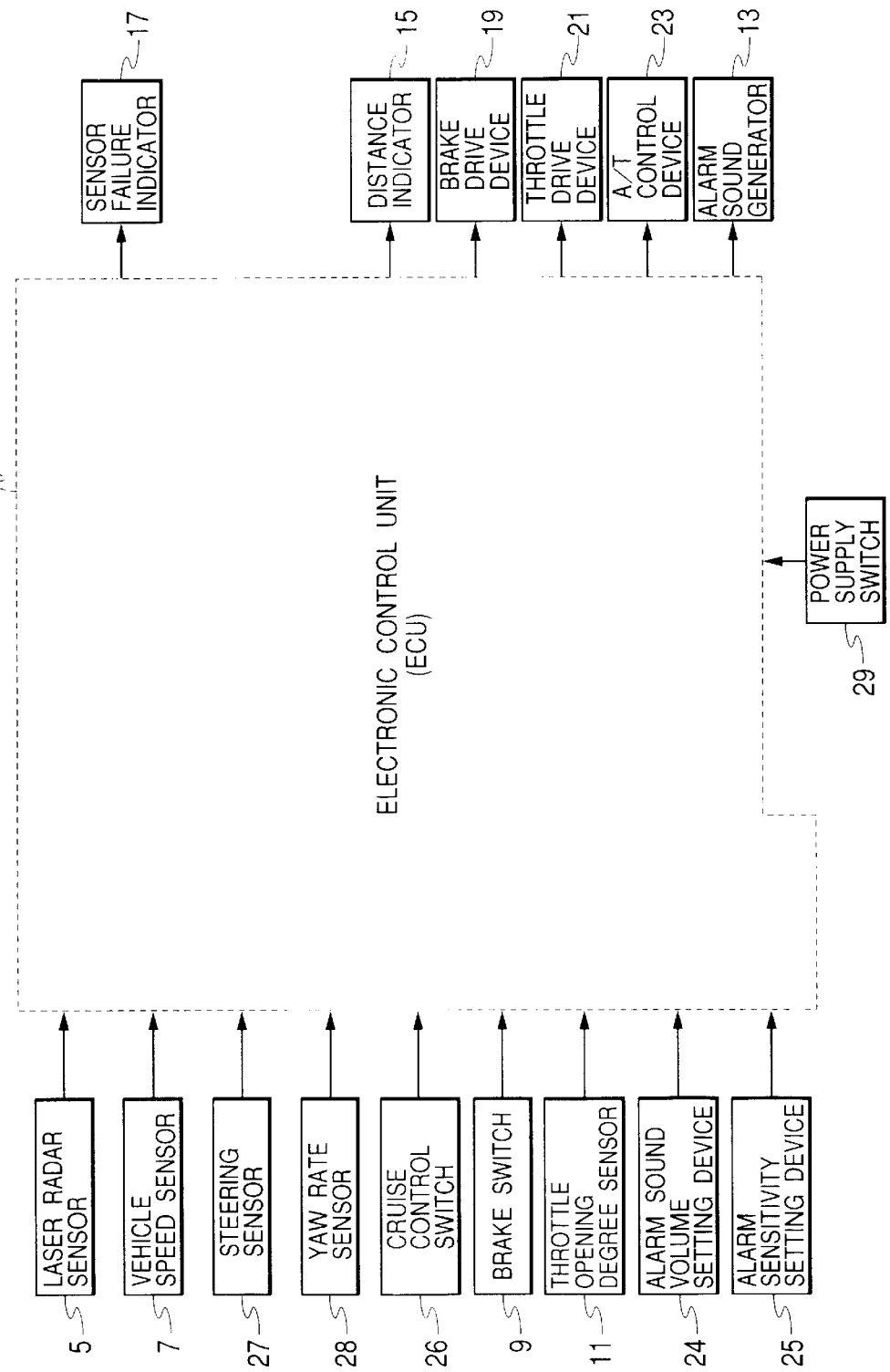
FIG. 1 is a block diagram of a vehicle control apparatus according to a first embodiment of this invention.

FIG. 1 shows a vehicle control apparatus according to a first embodiment of this invention. The vehicle control apparatus is mounted on a vehicle. The vehicle control apparatus alarms when an obstacle in a specified condition exists in a given angular region (a given detection area) in front of the present vehicle. The vehicle control apparatus adjusts the speed of the present vehicle in accordance with the speed of a preceding vehicle. The vehicle control apparatus includes a recording medium.

As shown in FIG. 1, the vehicle control apparatus includes an electronic control unit (ECU) 3 having a computer such as a microcomputer. The computer in the ECU 3 has a combination of an input/output (I/O) interface, a CPU, a ROM, and a RAM. The ECU 3 (the computer therein) operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, a DVD-ROM, or a hard disk. In this case, the ECU 3 is connected with a drive for the recording medium, and the program is downloaded into the computer of the ECU 3 through the drive.

The vehicle control apparatus includes a laser radar sensor 5, a vehicle speed sensor 7, a brake switch 9, and a throttle opening degree sensor (a throttle position sensor) 11 which are connected to the ECU 3. The output signals of the devices 5, 7, 9, and 11 are inputted into the ECU 3.

The vehicle control apparatus includes an alarm sound generator 13, a distance indicator 15, a sensor failure indicator 17, a brake drive device 19, a throttle drive device 21, and an automotive automatic transmission control device 23 which are connected to the ECU 3. The ECU 3 outputs drive signals to the devices 13, 15, 17, 19, 21, and 23.

The vehicle control apparatus includes an alarm sound volume setting device 24, an alarm sensitivity setting device 25, a cruise control switch 26, a steering sensor 27, and a yaw rate sensor 28 which are connected to the ECU 3. The output signals of the devices 24, 25, 26, 27, and 28 are inputted into the ECU 3. The alarm sound volume setting device 24 acts to set the volume of alarm sound. The alarm sensitivity setting device 25 acts to set the sensitivity in a warning determination process mentioned later.

The vehicle control apparatus includes a power supply switch 29 connected to the ECU 3. When the power supply switch 29 is changed to its on position, the ECU 3 is powered and starts predetermined processes.

The laser radar sensor 5 has a transmitting and receiving portion, and a distance and angle calculating portion. The transmitting and receiving portion emits a forward laser beam ahead of the present vehicle, and controls the forward laser beam to periodically scan a given angular region in front of the present vehicle. The given angular region corresponds to a given sectorial detection area monitored by the transmitting and receiving portion. In the case where an object exists in the detection area (the given angular region), the forward laser beam encounters the object before being at least partially reflected thereby. A portion of the reflected laser beam returns to the transmitting and receiving portion as an echo laser beam. The transmitting and receiving portion receives the echo laser beam, and converts the echo laser beam into a corresponding electric signal. The transmitting and receiving portion outputs the electric signal to the distance and angle calculating portion. The distance and angle calculating portion detects the angle (the angular position) "θ" of the object in response to the output signal from the transmitting and receiving portion. The distance and angle calculating portion measures the time interval between the moment of the transmission of a forward laser beam and the moment of the reception of a related echo laser beam in response to the output signal from the transmitting and receiving portion. The distance and angle calculating portion detects the distance "r" to the object from the present vehicle on the basis of the measured time interval. The distance and angle calculating portion informs the ECU 3 of the angle (the angular position) "θ" of the object and the distance "r" thereto. In general, since the object is greater than the cross-sectional area of the forward laser beam and is scanned thereby, the distance and angle information notified from the distance and angle calculating portion to the ECU 3 relates to a partial object or a point-like part of an object. Objects detected by the laser radar sensor 5 include obstacles with respect to the present vehicle.

During every scanning period (every frame period), the angular direction of the forward laser beam is changed a unit-angle by a unit-angle. The unit angle corresponds to, for example, 0.15 degrees. The detection area (the given angular region) scanned by the forward laser beam has an angular range of, for example, about 16 degrees which extends in the width-wise direction of the present vehicle as viewed therefrom. In this case, the detection area corresponds to 105 image points or pixels (105 multiplied by 0.15 degrees equals about 16 degrees) composing one frame.

The laser beam may be replaced by a radio wave beam, a millimeter wave beam, or an ultrasonic beam. The scanning may be implemented by controlling the echo beam reception by the transmitting and receiving portion in the laser radar sensor 5.

The ECU 3 receives the measurement data (the distance and angle information) from the laser radar sensor 5. The ECU 3 recognizes objects on the basis of the measurement data. The ECU 3 detects a preceding vehicle with respect to the present vehicle on the basis of the result of the object recognition. In addition, the ECU 3 detects conditions of the preceding vehicle. The ECU 3 executes inter-vehicle distance control. During the execution of the inter-vehicle distance control, the ECU 3 generates and outputs suitable drive signals to the brake drive unit 19, the throttle drive device 21, and the automotive automatic transmission control device 23 to adjust the speed of the present vehicle in accordance with the conditions of the preceding vehicle. Simultaneously with the execution of the inter-vehicle distance control, the ECU 3 executes a warning determination process designed to generate an alarm in the case where an obstacle corresponding to a recognized object remains in a specified area during longer than a prescribed time interval. The obstacle corresponds to, for example, a preceding vehicle, a stationary vehicle, a guardrail on a road side, or a prop on a road side.

The vehicle speed sensor 7 is associated with a wheel of the present vehicle. The vehicle speed sensor 7 detects the rotational speed of the vehicle wheel. The vehicle speed sensor 7 outputs a signal to the ECU 3 which represents the detected rotational speed of the vehicle wheel.

The steering sensor 27 detects the degree of operation of a vehicle steering wheel (not shown), that is, the steering angle in the present vehicle. Specifically, the steering sensor 27 detects a quantity of change of the steering angle. The steering sensor 27 outputs a signal to the ECU 3 which represents the detected quantity of change of the steering angle. When the power supply switch 29 is moved to its on position, a variable used in the ECU 3 as an indication of a detected steering angle "θ" (radian) is initialized to "0". After the movement of the power supply switch 29 to its on position, the detected steering angle "θ" is decided by integrating the quantity of change of the steering angle which is represented by the output signal of the steering sensor 27.

The yaw rate sensor 28 detects the rate Ω (radian/second) of change in the rotational angle (the yaw angle) of the body of the present vehicle about the vertical axis thereof. The yaw rate sensor 28 informs the ECU 3 of the detected yaw rate Ω.

When the cruise control switch 26 is changed to its on position, the ECU 3 operates to start the vehicle cruise control. During the execution of the vehicle cruise control, signal processing for the inter-vehicle distance control can be implemented by the ECU 3. When the ECU 3 determines that the present vehicle is excessively close to an objective preceding vehicle, the alarm sound generator 13 is activated by the ECU 3 to generate alarm sound.

The volume of the generated alarm sound is equal to a level adjustably determined by the alarm sound volume setting device 24. The sensitivity of generation of alarm sound can be adjusted by the alarm sensitivity setting device 25.

The brake switch 9 detects depression of a brake pedal of the present vehicle. The brake switch 9 informs the ECU 3 of the detected brake-pedal depression. The ECU 3 generates a drive signal for the brake drive device 19 in response to information containing the information of the detected brake-pedal depression. The ECU 3 outputs the generated drive signal to the brake drive device 19. The brake drive device 19 adjusts the braking pressure in response to the drive signal outputted from the ECU 3.

The throttle opening degree sensor 11 detects the degree of opening through a vehicular engine throttle valve. The throttle opening degree sensor 11 outputs a signal to the ECU 3 which represents the detected throttle opening degree. The ECU 3 controls the throttle drive device 21 in response to the detected throttle opening degree, thereby adjusting the actual degree of opening through the throttle valve and adjusting the power output of the engine.

The ECU 3 determines whether or not the laser radar sensor 5 is operating normally by referring to the output signal therefrom. When the ECU 3 determines that the laser radar sensor 5 is not operating normally, the sensor failure indicator 17 is controlled by the ECU 3 to indicate a failure.

The ECU 3 selects an objective preceding vehicle from among candidate preceding vehicles detected in response to the output signal of the laser radar sensor 5. The ECU 3 calculates the distance to the objective preceding vehicle from the present vehicle. The distance indicator 15 is controlled by the ECU 3 to indicate the calculated distance to the objective preceding vehicle from the present vehicle.

The automotive automatic transmission control device 23 selects a used gear position of an automotive automatic transmission and thereby controls the speed of the present vehicle in response to the output signal from the ECU 3.

FIG. 2 shows the flow of operation of the ECU 3 rather than the hardware structure thereof. With reference to FIG. 2, an object recognition block 43 receives, from the distance and angle calculating portion in the laser radar sensor 5, measurement data representing a distance "r" and an angle "θ" concerning each detected object (each detected partial object or each detected point-like object part). The object recognition block 43 converts the distance and angle data of polar coordinates into measurement data of X-Z orthogonal coordinates designed so that the origin (0, 0) coincides with the center of a laser radar formed by the sensor 5, and the X axis and the Z axis coincide with a width-wise direction and a longitudinal forward direction of the present vehicle respectively. The object recognition block 43 groups detected partial objects (detected point-like object parts) represented by the orthogonal-coordinate measurement data into sets or segments corresponding to detected complete objects respectively. The grouping and the segments will be described later. Pieces of the grouping-resultant segment data which indicate respective segments are object-unit data pieces (per-object data pieces). A model of a complete object which is represented by central position data, size data, relative-speed data, and stationary-moving determination result data (recognition type data) will be called a target model.

A vehicle speed calculation block 47 computes the speed V of the present vehicle on the basis of the output signal from the vehicle speed sensor 7.

The object recognition block 43 calculates the central position (X, Z) and size (W, D) of each detected complete object on the basis of the grouping-resultant segment data. Here, W denotes a transverse width, and D denotes a depth. The object recognition block 43 calculates the speed (Vx, Vz) of the complete object relative to the present vehicle from a time-domain variation in the central position (X, Z) thereof. The object recognition block 43 is informed of the speed V of the present vehicle by the vehicle speed calculation block 47. The object recognition block 43 determines whether or not each detected complete object is stationary or moving on the basis of the vehicle speed V and the relative speed (Vx, Vz). One or more which may affect the travel of the present vehicle are selected from detected complete objects on the basis of the stationary-moving determination results and the central positions of the detected complete objects. Information of the distance to each selected complete object is transferred to the distance indicator 15 so that the distance to the selected complete object is indicated by the distance indicator 15.

A sensor failure detection block 44 receives the output data (the object-recognition result data) from the object recognition block 43 which represent the object parameters calculated thereby. The sensor failure detection block 44 determines whether the output data from the object recognition block 43 are in a normal range or an abnormal range. When the output data from the object recognition block 43 are in the abnormal range, the sensor failure detection block 44 activates the sensor failure indicator 17 to indicate a failure.

A steering angle calculation block 49 computes the steering angle regarding the present vehicle on the basis of the output signal from the steering sensor 27. A yaw rate calculation block 51 computes the yaw rate of the present vehicle on the basis of the output signal from the yaw rate sensor 28.

A curvature-radius calculation block 57 is informed of the vehicle speed V by the vehicle speed calculation block 47. The curvature-radius calculation block 57 is informed of the computed steering angle by the steering angle calculation block 49. The curvature-radius calculation block 57 is informed of the computed yaw rate by the yaw rate calculation block 51. The curvature-radius calculation block 57 computes the radius R of curvature of the road on the basis of the vehicle speed V, the steering angle, and the yaw rate. The curvature-radius calculation block 57 informs the object recognition block 43 of the computed curvature radius R.

The object recognition block 43 detects preceding vehicles among the detected complete objects by referring to the central positions, the sizes, the relative speeds, and the recognition types thereof. The object recognition block 43 computes the probability (the lane-sameness probability) P that the lanes along which the present vehicle and each preceding vehicle (or each detected complete object) are traveling respectively are the same on the basis of the curvature radius R and the central position and size of the preceding vehicle (or the detected complete object).

A preceding-vehicle determination block 53 is informed of the lane-sameness probability P for each preceding vehicle (each detected complete object) by the object recognition block 43. In addition, the preceding-vehicle determination block 53 is informed of the central position, the size, the relative speed, and the recognition type of each detected complete object by the object recognition block 43. The preceding-vehicle determination block 53 detects an objective preceding vehicle on the basis of the lane-sameness probabilities P, the central positions, the sizes, the relative speeds, and the recognition types of the detected complete objects. Specifically, the preceding-vehicle determination block 53 selects an objective preceding vehicle from candidate complete objects (candidate preceding vehicles) in response to the lane-sameness probabilities P, the central positions, the sizes, the relative speeds, and the recognition types of the detected complete objects.

An inter-vehicle distance control and warning determination block 55 is informed of the distance Z to the objective preceding vehicle and the relative speed Vz of the objective preceding vehicle by the preceding-vehicle determination block 53. The inter-vehicle distance control and warning determination block 55 is informed of the vehicle speed V by the vehicle speed calculation block 47. The inter-vehicle distance control and warning determination block 55 detects setting conditions of the cruise control switch 26 from the output signal thereof. The inter-vehicle distance control and warning determination block 55 detects the state of the brake switch 9 from the output signal thereof. The state of the brake switch 9 represents whether or not the vehicle brake pedal is depressed. The inter-vehicle distance control and warning determination block 55 is informed of the degree of opening through the vehicular engine throttle valve by the throttle opening degree sensor 11. The inter-vehicle distance control and warning determination block 55 is informed of the alarm volume setting value by the alarm sound volume setting device 24. The inter-vehicle distance control and warning determination block 55 is informed of the alarm sensitivity setting value by the alarm sensitivity setting device 25. The inter-vehicle distance control and warning determination block 55 implements a warning determination and a cruise determination in response to the distance Z to the objective preceding vehicle, the relative speed Vz of the objective preceding vehicle, the vehicle speed V, the setting conditions of the cruise control switch 26, the state of the brake switch 9, the throttle opening degree, and the alarm sensitivity setting value. During the warning determination, the inter-vehicle distance control and warning determination block 55 determines whether or not an alarm should be generated. During the cruise determination, the inter-vehicle distance control and warning determination block 55 determines the contents of vehicle speed control. When it is determined that an alarm should be generated, the inter-vehicle distance control and warning determination block 55 outputs an alarm generation signal to the alarm sound generator 13. In this case, the alarm sound generator 13 produces alarm sound. The inter-vehicle distance control and warning determination block 55 adjusts the level of the alarm sound in accordance with the sound volume set by the alarm sound volume setting device 24. In the case where the cruise determination corresponds to the execution of cruise control, the inter-vehicle distance control and warning determination block 55 outputs suitable control signals to the automotive automatic transmission control device 23, the brake drive device 19, and the throttle drive device 21. During the execution of the warning control and the cruise control, the inter-vehicle distance control and warning determination block 55 outputs an indication signal to the distance indicator 15 to inform the vehicle's driver of distance-related conditions.

As previously mentioned, the ECU 3 operates in accordance with a program stored in its internal ROM or RAM. FIG. 3 is a flowchart of a portion of the program for the ECU 3 which relates to object recognition. The program portion in FIG. 3 is repetitively executed at a period corresponding to the period of the scanning implemented by the laser radar sensor 5.

As shown in FIG. 3, a first step S1 of the program portion receives distance and angle measurement data from the laser radar sensor 5 for one period of the scanning. In other words, the step S1 receives distance and angle measurement data corresponding to one frame. The scanning period is equal to, for example, 100 msec.

A step S2 following the step S1 converts the distance and angle data of polar coordinates into measurement data of X-Z orthogonal coordinates. The orthogonal-coordinate measurement data represent detected partial objects or detected point-like object parts. The step S2 groups the detected point-like object parts (the detected partial objects) into segments corresponding to detected complete objects respectively.

Figure 4:
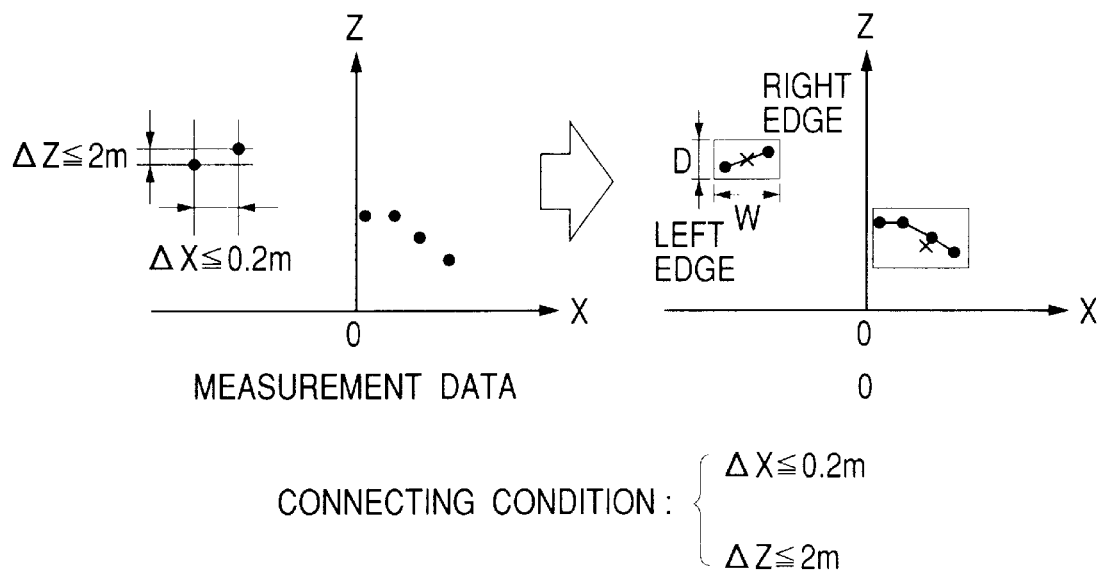
FIG. 4 is a diagram of an example of detected point-like object parts, and segments which result from unifying close ones of the detected point-like object parts.

With reference to FIG. 4, the step S2 searches the detected point-like object parts for close ones which are spaced by X-axis-direction distances $\Delta X$ of 0.2 m or less and Z-axis-direction distances $\Delta Z$ of 2 m or less. The step S2 combines or unifies the close point-like object parts into a segment (a set) corresponding to a detected complete object. There can be a plurality of segments. The step S2 generates data representing segments which are referred to as segment data. Specifically, one segment data piece (one data piece representing a segment) generated by the step S2 corresponds to a rectangular region having two sides parallel to the X axis and two sides parallel to the Z axis. One segment data piece contains an information piece indicating the central position of the related segment, an information piece indicating the size (W, D) of the segment, an information piece indicating the coordinates of the right-hand edge of the segment, and the coordinates of the left-hand edge of the segment.

With reference back to FIG. 3, a block S3 subsequent to the step S2 generates target models from the segment data pieces provided by the step S2. After the block S3, the current execution cycle of the program portion ends.

As shown in FIG. 5, the block S3 has a step S31 following the step S2 in FIG. 3. The step S31 searches for segment data pieces corresponding to target models. Specifically, the step S31 handles target models which have been generated at or before the immediately-previous execution cycle of the program portion. Also, the step S31 handles the segment data pieces generated by the step S2 during the current execution cycle of the program portion. The step S31 determines which of the segment data pieces each of the target models corresponds to.

Figure 6:
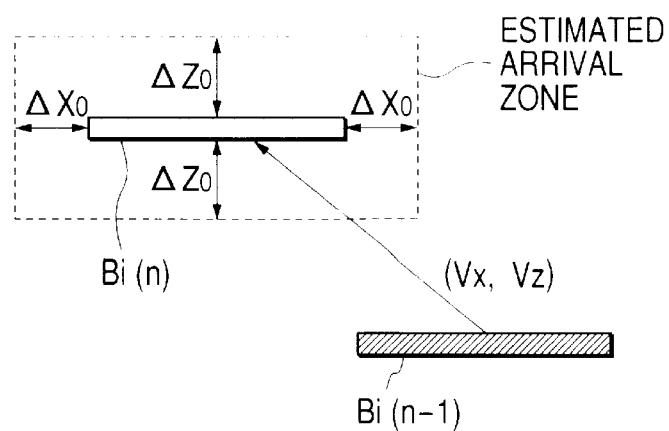
FIG. 6 is a diagram of the immediately-previous position, the estimated current position, and the relative speed of a target model, and an estimated arrival zone centered at the estimated current position.

With reference to FIG. 6, the step S31 refers to the position Bi(n-1) and relative speed (Vx, Vz) of each target model Bi which occur at the immediately-previous execution cycle of the program portion. The step S31 calculates an estimated current position Bi(n) of the target model Bi from the previous position Bi(n-1) and relative speed (Vx, Vz) thereof. Specifically, the estimated current position Bi(n) is equal to the previous position Bi(n-1) plus the relative speed (Vx, Vz) multiplied by the scanning period. The step S31 sets an estimated arrival zone BB centered at the estimated current position Bi(n) and extending around the target model in the estimated current position Bi(n). The estimated arrival zone BB is of a rectangular shape having upper and lower sides parallel to the X axis, and left-hand and right-hand sides parallel to the Z axis. The upper and lower sides of the estimated arrival zone BB are spaced from the upper and lower sides of the target model in the estimated current position Bi(n) at a predetermined interval $\Delta Zo$ (different from or equal to the upper limit of the Z-axis-direction distances $\Delta Z$ used in the step S2). The left-hand and right-hand sides of the estimated arrival zone BB are spaced from the left-hand and right-hand sides of the target model in the estimated current position Bi(n) at a predetermined interval $\Delta Xo$ (different from or equal to the upper limit of the X-axis-direction distances $\Delta X$ used in the step S2). The step S31 searches the current segment data pieces for hit one representing a complete object at least partially contained in the estimated arrival zone BB. The step S31 determines that the hit current segment data piece corresponds to the target model Bi.

As shown in FIG. 5, a block S32 follows the step S31. The block S32 updates data of each target model Bi. Specifically, in the presence of a current segment data piece corresponding to each target model Bi, the block S32 upstates data of the target model Bi. After the block S32, the program advances to a step S33.

Figure 7:
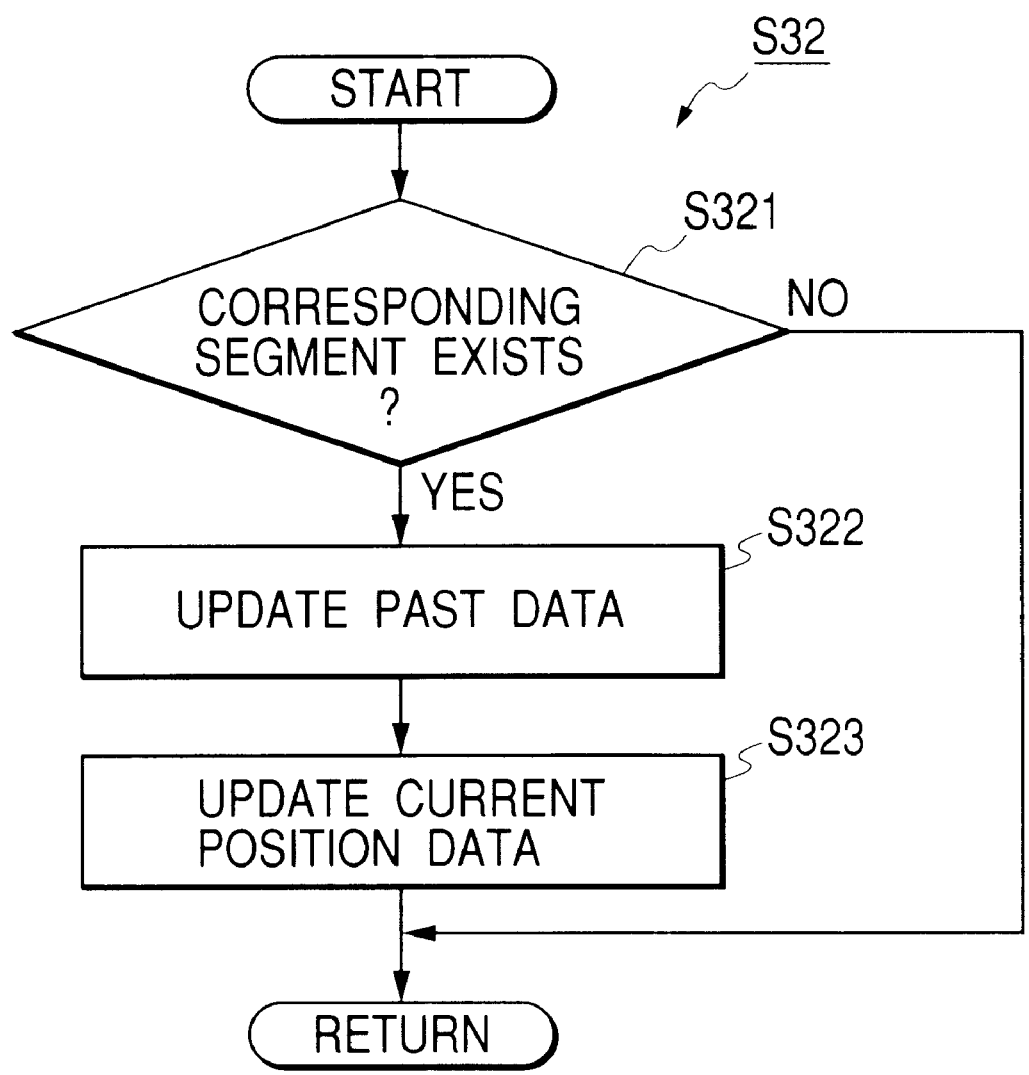
FIG. 7 is a flowchart of a first block in FIG. 5.

With reference to FIG. 7, the block S32 has a step S321 following the step S31 (see FIG. 5). The step S321 determines whether a current segment data piece corresponding to each target model Bi is present or absent. When the step S321 determines that a current segment data piece corresponding to the target model Bi is present, the program advances from the step S321 to a step S322. The step S322 updates past data of the target model Bi in response to the corresponding current segment data. A step S323 subsequent to the step S322 updates current-position data of the target model Bi in response to the corresponding current segment data. When the step S321 determines that a current segment data piece corresponding to the target model Bi is absent, the program exits from the step S321 and then skips over the steps S322 and S323. The above-indicated sequence of the steps S321, S322, and S323 is executed for each of target models. After the signal processing for all the target models has been completed, the program advances from the block S32 to the step S33 (see FIG. 5).

With reference back to FIG. 5, the step S33 registers a new target model or models. The step S33 selects one or ones out of the current segment data pieces which correspond to none of the target models. The step S33 registers the selected current segment data piece or pieces as a new target model or models. The step S33 limits the number of new target models to a prescribed number (for example, 8).

A block S34 follows the step S33. The block S34 implements a process of merging target models. A wrong target model is caused by, for example, noise. In the case where there are a correct target model and a wrong target model for one complete object, the block S34 deletes the wrong target model. After the block S34, the program advances to a step S35.

Figure 8:
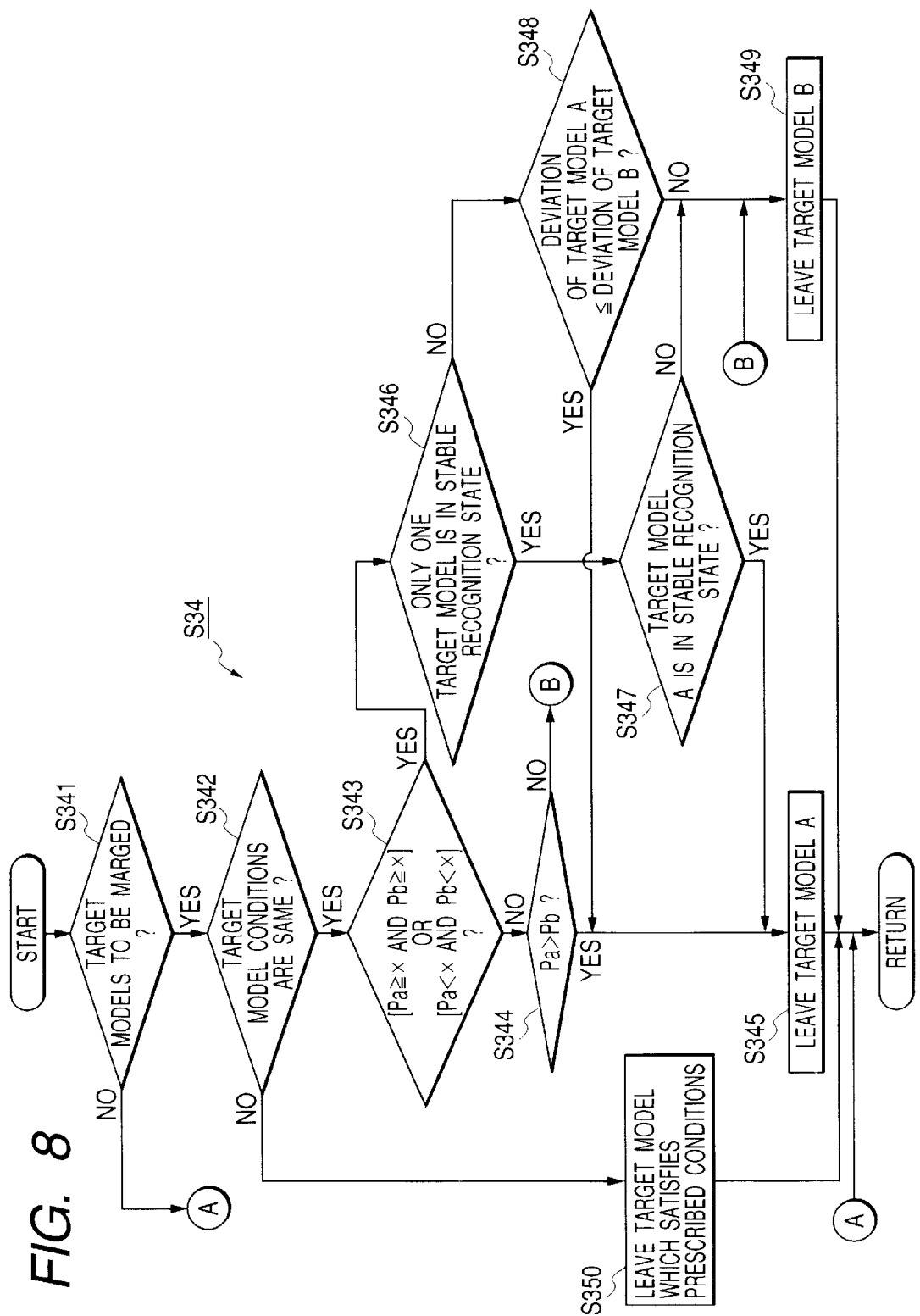
FIG. 8 is a flowchart of a second block in FIG. 5.

As shown in FIG. 8, the block S34 has a step S341 following the step S33 (see FIG. 5). The step S341 determines whether or not the target models have at least one pair which should be merged. When the step S341 determines that the target models have at least one pair which should be merged, the program advances from the step S341 to a step S342. Otherwise, the program jumps from the step S341 to the step S35 (see FIG. 5).

Figure 9:
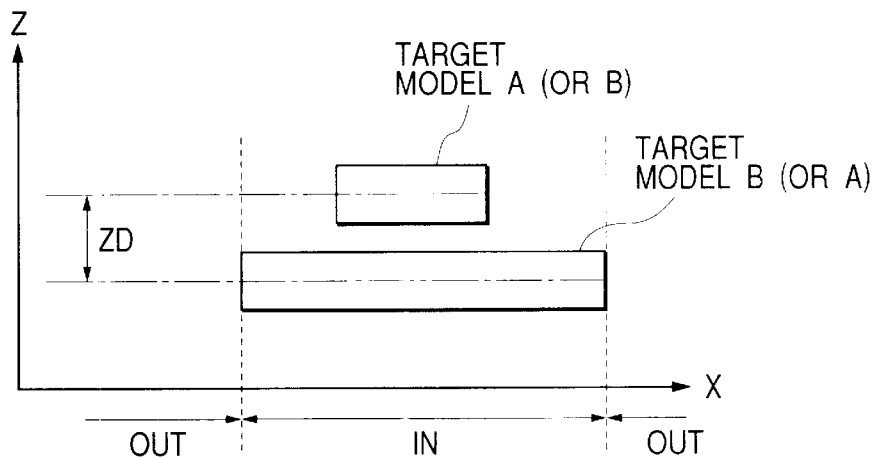
FIG. 9 is an example of target models to be merged.

Conditions of two target models "A" and "B" which should be merged are as follows. A first condition is that as shown in FIG. 9, the X-direction range of one of the target models "A" and "B" is contained in the X-direction range of the other. A second conditions is that the Z-direction distance ZD between the centers of the target models "A" and "B" is smaller than a predetermined threshold value. The step S341 judges whether or not the first and second conditions are satisfied. When the first and second conditions are satisfied, the step S341 determines that the target models "A" and "B" should be merged. In this case, the program advances from the step S341 to the step S342, and a process of deleting one of the target models "A" and "B" and leaving the other is started. When the first and second conditions are not satisfied, the step S341 determines that the target models "A" and "B" should not be merged. In this case, the program jumps from the step S341 to the step S35 (see FIG. 5).

The step S342 determines whether or not the recognition types (the stationary-moving determination results) of the target models "A" and "B" are the same. When the recognition types of the target models "A" and "B" are the same, the program advances from the step S342 to a step S343. Otherwise, the program advances from the step S342 to a step S350.

The step S350 deletes one of the target models "A" and "B", and leaves the other. Specifically, the step S350 leaves one of the target models "A" and "B" according to predetermined conditions ① and ② as follows.

The condition ①: In the case where one of the target models "A" and "B" continues to be present for a prescribed time interval (for example, 2 seconds) or longer, the one is left.

The condition ②: In the absence of a target model satisfying the condition ①, one of the target models "A" and "B" is left which is longer in time interval during which the target model continues to be present.

After the step S350, the program advances to the step S35 (see FIG. 5).

The step S343 assigns the variables Pa(%) and Pb(%) to the immediately-previous lane-sameness probabilities of the target models "A" and "B", respectively. The step S343 refers to a predetermined threshold value X(%) for selection as an objective preceding vehicle. The step 3343 determines whether or not Pa(%)≧X(%) and Pb(%)≧X(%). In addition, the step S343 determines whether or not Pa(%)<X(%) and Pb(%)<X(%). When Pa(%)≧X(%) and Pb(%)≧X(%) or when Pa(%)<X(%) and Pb(%)<X(%), the program advances from the step S343 to a step S346.

Otherwise, the program advances from the step S343 to a step S344.

The step S344 determines whether or not Pa(%)>Pb(%). When Pa(%)>Pb(%), the program advances from the step S344 to a step S345. Otherwise, the program advances from the step S344 to a step S349.

The step S345 leaves the target model "A". In other words, the step S345 deletes the target model "B". After the step S345, the program advances to the step S35 (see FIG. 5).

The step S349 leaves the target model "B". In other words, the step S349 deletes the target model "A". After the step S349, the program advances to the step S35 (see FIG. 5).

The step S346 determines whether or not only one of the target models "A" and "B" is in a predetermined stable state. When only one of the target models "A" and "B" is in the predetermined stable state, the program advances from the step S346 to a step S347. Otherwise, the program advances from the step S346 to a step S348.

Specifically, the step S346 calculates the accelerations of the target models "A" and "B" relative to the present vehicle. The step S346 refers to a prescribed usual range and a prescribed unusual range for each of the calculated accelerations. An acceleration in the prescribed unusual range hardly occurs under ordinary traffic situations. The step S346 compares each of the calculated acceleration with the prescribed usual range and the prescribed unusual range. The step S346 judges a target model to be in the predetermined stable state when the related calculated acceleration is in the prescribed usual range. On the other hand, the step S346 judges a target model to be not in the predetermined stable state when the related calculated acceleration is in the prescribed unusual range. In more detail, the step S346 calculates the absolute values of the accelerations of the target models "A" and "B" relative to the present vehicle. The step S346 compares each of the calculated absolute values of the accelerations with a predetermined reference value. The step S346 judges a target model to be in the predetermined stable state when the calculated absolute value of the related acceleration is equal to or smaller than the predetermined reference value. On the other hand, the step S346 judges a target model to be not in the predetermined stable state when the calculated absolute value of the related acceleration is greater than the predetermined reference value.

The step S347 determines whether or not the target model "A" is in the predetermined stable state. When the target model "A" is in the predetermined stable state, the program advances from the step S347 to the step S345 which leaves the target model "A". Otherwise, the program advances from the step S347 to the step S349 which leaves the target model "B".

The step S348 calculates a distance deviation related to the target model "A" and a distance deviation related to the target model "B". The step S348 compares the calculated distance deviations with each other. When the distance deviation related to the target model "A" is equal to or smaller than that related to the target model "B", the program advances from the step S348 to the step S345 which leaves the target model "A". Otherwise, the program advances from the step S348 to the step S349 which leaves the target model "B".

Figure 10:
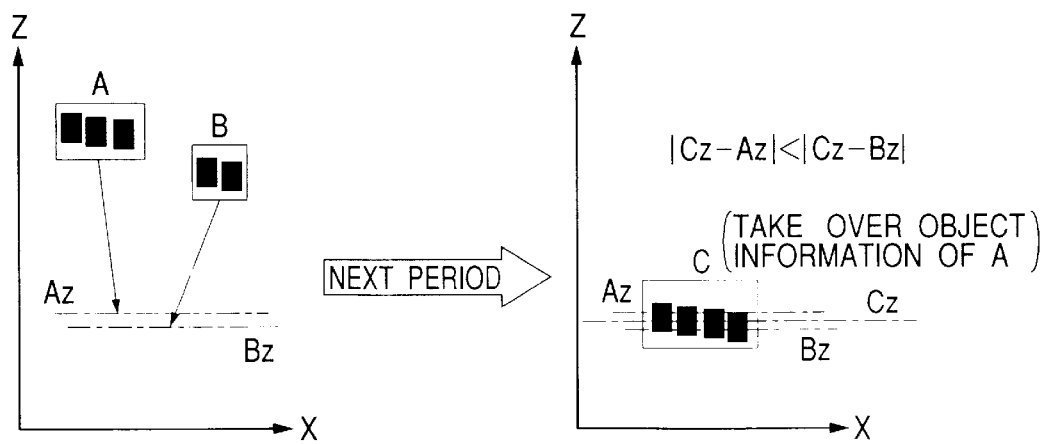
FIG. 10 is a diagram of target models, and distance deviations related thereto.

The estimated current position of a target model is calculated from the previous position and relative speed thereof. The current position of a target model is determined in the current execution cycle of the program portion. A distance deviation used in the step S348 means the difference between the estimated current position of a target model and the actually-determined current position thereof. With reference to FIG. 10, the step S348 refers the distances to the target models "A" and "B" and the relative speeds of the target models "A" and "B" which occur in the immediately-previous execution cycle of the program portion. The step S348 calculates estimated current distances Az and Bz to the target models "A" and "B" on the basis of the previous distances and relative speeds thereof Specifically, the estimated current distance Az to the target model "A" is equal to the previous distance plus the previous relative speed multiplied by the measurement period (the scanning period). Similarly, the estimated current distance Bz to the target model "B" is equal to the previous distance plus the previous relative speed multiplied by the measurement period (the scanning period). During the current execution cycle of the program portion, the step S348 provisionally combines the target models "A" and "B" into a target model "C". The step S348 determines the current distance Cz related to the target model "C".

The step S348 calculates |Cz−Az|, that is, the absolute value of the difference between the distance Cz and the distance Az related to the target model "A". The calculated absolute value |Cz−Az| is defined as the distance deviation related to the target model "A". Also, the step S348 calculates |Cz−Bz|, that is, the absolute value of the difference between the distance Cz and the distance Bz related to the target model "B". The calculated absolute value |Cz−Bz| is defined as the distance deviation related to the target model "B".

With reference back to FIG. 5, the step S35 computes the probability (the lane-sameness probability) P that the lanes along which the present vehicle and the complete object (the preceding vehicle) represented by each target model are traveling respectively are the same. After the step S35, the program exits from the block S3 (see FIG. 3) and then the current execution cycle of the program portion ends.

Figure 11:
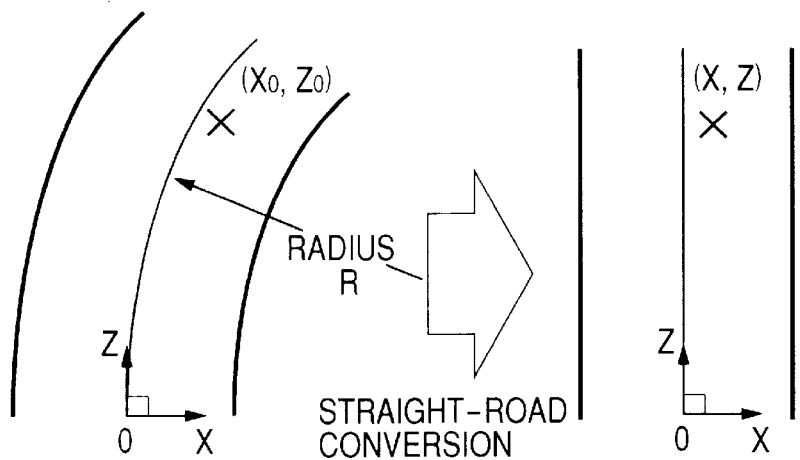
FIG. 11 is a diagram of conversion of coordinates.

The step S35 will further be described below. The step S35 computes the radius R of curvature of the road on the basis of the vehicle speed V, the steering angle, and the yaw rate. For each of the complete objects (the target models), the step S35 computes the instantaneous probability (the instantaneous lane-sameness probability) Po that the complete object is traveling along the lane same as the lane along which the present vehicle is moving. The computation of the instantaneous lane-sameness probability Po is based on the computed road curvature radius R, and the central position (Xo, Zo) and size of the complete object. Specifically, as shown in FIG. 11, the step S35 converts the coordinates (Xo, Zo) of the central position of each complete object (each target model) into the coordinates (X, Z) thereof which occur on the assumption that the present vehicle is traveling along a straight road. In more detail, the step S35 converts the coordinate values Xo and Zo into the coordinate values X and Z according to the following equations.

$$X = Xo - (Zo^2/2R) \quad (1)$$

$$Z = Zo \quad (2)$$

The equations (1) and (2) are made on the basis of approximation using the assumption that the absolute value of the coordinate value Xo is significantly smaller than the road curvature radius R and the coordinate value Zo ($|Xo| \ll |R|$ and $|Xo| \ll Z$). The step S35 converts the size of each complete object (each target object) in accordance with the above-indicated conversion of the central position of the complete object. In the case where the laser radar sensor 5 is significantly distant from the center of the body of the present vehicle, the X-Z coordinate system is corrected so that the origin thereof will coincide with the vehicle center. The ROM within the ECU 3 stores data representing a map of a predetermined relation among the instantaneous lane-sameness probability Po, the coordinate values X and Z, and the conversion-resultant complete-object size. The step S35 derives the instantaneous lane-sameness probability Po by accessing the map in response to the coordinate values X and Z and the conversion-resultant complete-object size.

Figure 12:
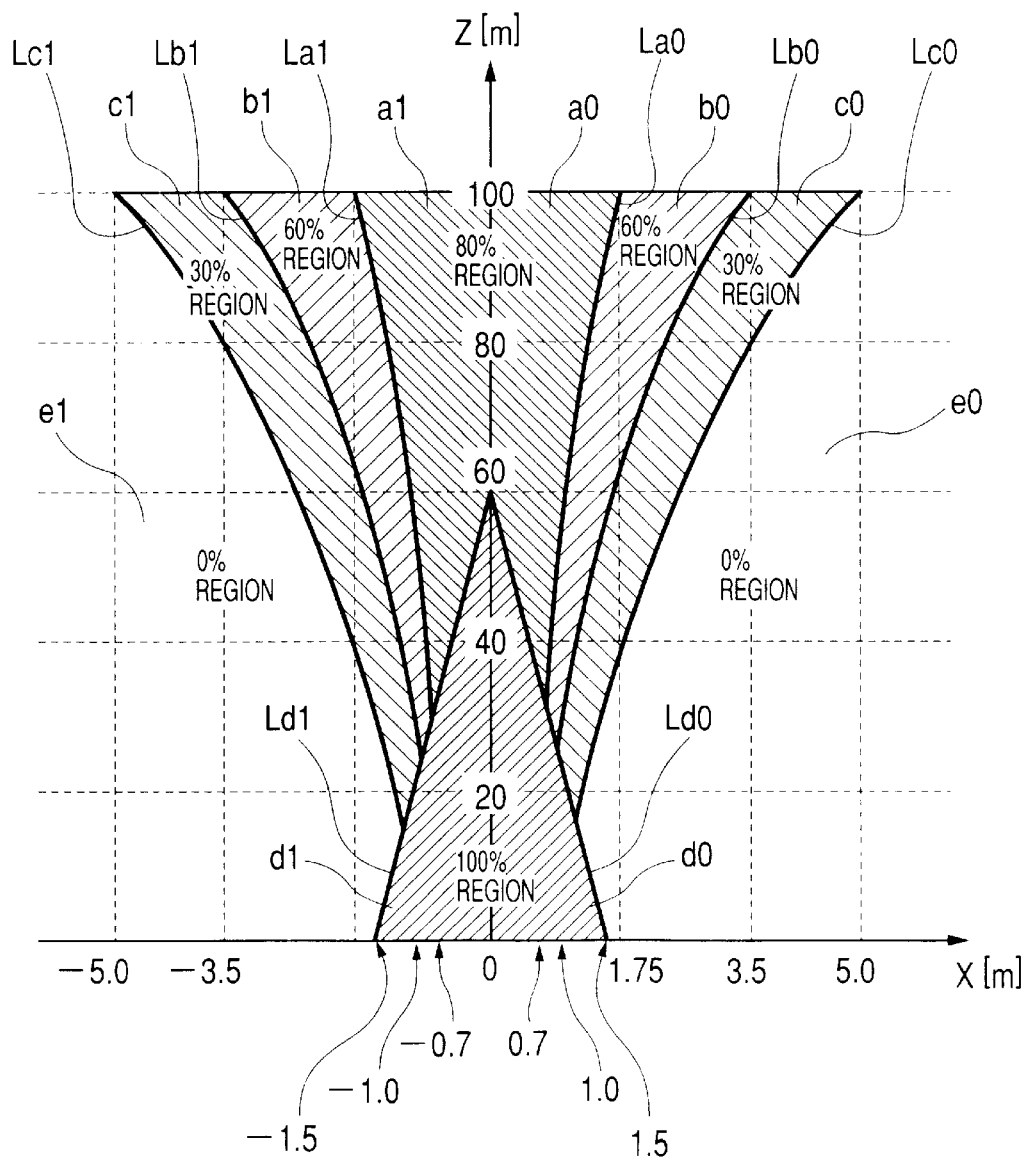
FIG. 12 is a diagram of a map for determining an instantaneous lane-sameness probability which is separated into regions.

FIG. 12 shows an example of the map for the instantaneous lane-sameness probability Po. In FIG. 12, the X axis corresponds to the width-wise direction of the present vehicle while the Z axis corresponds to the longitudinal forward direction of the present vehicle (that is, the direction along which the present vehicle is traveling). With reference to FIG. 12, there are separate regions a0, b0, c0, d0, e0, a1, b1, c1, d1, and e1. The regions a0 and a1 are symmetrical with respect to the Z axis. The regions b0 and b1 are symmetrical with respect to the Z axis. The regions c0 and c1 are symmetrical with respect to the Z axis. The regions d0 and d1 are symmetrical with respect to the Z axis. The regions e0 and e1 are symmetrical with respect to the Z axis. An instantaneous lane-sameness probability Po of 80% is assigned to the regions a0 and a1. An instantaneous lane-sameness probability Po of 60% is assigned to the regions b0 and b1. An instantaneous lane-sameness probability Po of 30% is assigned to the regions c0 and c1. An instantaneous lane-sameness probability Po of 100% is assigned to the regions d0 and d1. An instantaneous lane-sameness probability Po of 0% is assigned to the regions e0 and e1. The setting of the regions a0, b0, c0, d0, e0, a1, b1, c1, d1, and e1, and the assignment of probability values thereto are decided in consideration of the results of experiments including actual measurement. Preferably, the regions d0 and d1 are chosen in view of the case where another vehicle suddenly comes into a zone immediately preceding the present vehicle. There are boundaries La0, Lb0, Lc0, and Ld0 among the regions a0, b0, c0, d0, and e0. The boundaries La0, Lb0, Lc0, and Ld0 are given according to the following equations.

$$La0: X = 0.70 + (1.75 - 0.70) \cdot (Z/100)^2 \quad (3)$$

$$Lb0: X = 0.70 + (3.50 - 0.70) \cdot (Z/100)^2 \quad (4)$$

$$Lc0: X = 1.00 + (5.00 - 1.00) \cdot (Z/100)^2 \quad (5)$$

$$Ld0: X = 1.50 \cdot (1 - Z/60) \quad (6)$$

There are boundaries La1, Lb1, Lc1, and Ld1 among the regions a1, b1, c1, d1, and e1. The boundaries La0 and La1 are symmetrical with respect to the Z axis. The boundaries Lb0 and Lb1 are symmetrical with respect to the Z axis. The boundaries Lc0 and Lc1 are symmetrical with respect to the Z axis. The boundaries Ld0 and Ld1 are symmetrical with respect to the Z axis. The boundaries La1, Lb1, Lc1, and Ld1 are decided by referring to the symmetrical relation with the boundaries La0, Lb0, Lc0, and Ld0.

The equations (3), (4), (5), and (6) are determined on the basis of general equations as follows.

$$La0: X = A1 + B1 \cdot (Z/C1)^2 \quad (7)$$

$$Lb0: X = A2 + B2 \cdot (Z/C2)^2 \quad (8)$$

$$Lc0: X = A3 + B3 \cdot (Z/C3)^2 \quad (9)$$

$$Ld0: X = A4 \cdot (B4 - Z/C4) \quad (10)$$

The values of the parameters A1–A4, B1–B4, and C1–C4 are decided via experiments, and are chosen so as to have the following relations.

$$A1 \leq A2 \leq A3 \leq A4 \tag{11}$$

$$B1 \leq B2 \leq B3 \text{ and } B4=1 \tag{12}$$

$$C1=C2=C3 \tag{13}$$

It is more preferable that the boundaries La0, Lb0, Lc0, La1, Lb1, and Lc1 are accorded with circular arcs respectively. It is more preferable that the boundaries Ld0 and Ld1 are accorded with circular arcs or outwardly-convex parabolas.

For each of the complete objects (the target models), the step S35 applies the conversion-resultant coordinate values X and Z and the complete-object conversion-resultant size to the map in FIG. 12, and thereby determines the instantaneous lane-sameness probability Po. ① When at least part of a complete object is in or on the regions d0 and d1, the step S35 sets the instantaneous lane-sameness probability Po for the complete object to 100%. ② When the central position (X, Z) of a complete object is in the regions a0 and a1, the step S35 sets the instantaneous lane-sameness probability Po for the complete object to 80%. ③ When the central position (X, Z) of a complete object is in the regions b0 and b1, the step S35 sets the instantaneous lane-sameness probability Po for the complete object to 60%. ④ the central position (X, Z) of a complete object is in the regions c0 and c1, the step S35 sets the instantaneous lane-sameness probability Po for the complete object to 30%. For a complete object which satisfies none of the previously-indicated conditions ①, ②, ③, and ④, the step S35 sets the instantaneous lane-sameness probability Po to 0%.

Figure 13:
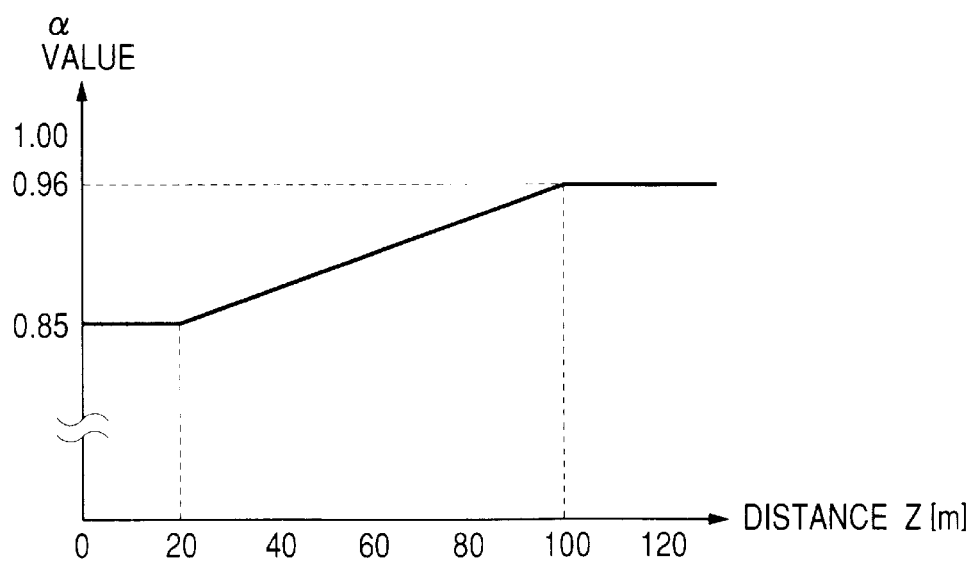
FIG. 13 is a diagram of a map representing a relation between a parameter "$\alpha$" and a distance Z.

For each of the complete objects (the target models), the step S35 subjects the instantaneous lane-sameness probability Po to a filtering process corresponding to a smoothing or low-pass filtering process. In more detail, for each of the complete objects, the step S35 calculates a current filtering-resultant lane-sameness probability (a current final lane-sameness probability) $P_n$ from the instantaneous lane-sameness probability Po according to the following equation.

$$P_n = P_{n-1} \cdot \alpha + Po \cdot (1-\alpha) \tag{14}$$

where $P_{n-1}$ denotes an immediately-previous filtering-resultant lane-sameness probability (an immediately-previous final lane-sameness probability), and "α" denotes a parameter depending on the distance Z to the complete object from the present vehicle. With reference to FIG. 13, the ROM within the ECU 3 stores data representing a map of a predetermined relation between the parameter "α" and the distance Z. For each of the complete objects (the target models), the step S35 derives the value of the parameter "α" by accessing the map in response to the distance Z. In FIG. 13, the parameter "α" remains equal to 0.85 as the distance Z increases from 0 m to 20 m. The parameter "α" linearly increases from 0.85 to 0.96 as the distance Z increases from 20 m to 100 m. The parameter "α" remains equal to 0.96 as the distance Z increases from 100 m. The initial value of the current filtering-resultant lane-sameness probability (the current final lane-sameness probability) $P_n$ is equal to 0%.

The step S35 in FIG. 5 corresponds to the object recognition block 43 in FIG. 2. Data of target models which contain data pieces representing current filtering-resultant lane-sameness probabilities are transferred from the object recognition block 43 to the preceding-vehicle determination block 53 in FIG. 2. An example of operation of the preceding-vehicle determination block 53 is as follows. The preceding-vehicle determination block 53 selects, from all the target models, ones related to current filtering-resultant lane-sameness probabilities equal to or higher than a predetermined threshold value TH (for example, 50%). The preceding-vehicle determination block 53 sets the selected target models as candidate ones. Then, the preceding-vehicle determination block 53 compares the distances Z related to the respective candidate target models to find the smallest of the distances Z. The preceding-vehicle determination block 53 selects one out of the candidate target models which corresponds to the smallest distance Z. The preceding-vehicle determination block 53 sets the selected target model as an objective preceding vehicle. The preceding-vehicle determination block 53 informs the inter-vehicle distance control and warning determination block 55 of the objective preceding vehicle and the related filtering-resultant lane-sameness probability.

As previously mentioned, the step S343 in FIG. 8 refers to the predetermined threshold value X(%) for selection as an objective preceding vehicle. The predetermined threshold value X(%) may be equal to the predetermined threshold value TH used in the preceding-vehicle determination block 53.

The laser radar sensor 5 corresponds to radar means. The object recognition block 43 provided by the ECU 3 corresponds to recognizing means. The steps in FIGS. 3, 5, 7, and 8 correspond to the function of the recognizing means.

The vehicle control apparatus has advantages as mentioned below. In the case where the recognition types (the stationary-moving determination results) of two target models which should be merged are the same, the program reaches the step S343 through the steps S341 and S342 in FIG. 8. The step S343 and the later steps S344, S345, and S349 select and leave one of the two target models as a candidate preceding vehicle on the basis of the lane-sameness probabilities of the two target models. Accordingly, it is possible to prevent an objective preceding vehicle from being lost. When selection of one of the two target models on the basis of the lane-sameness probabilities is difficult, the program advances from the step S343 to the step S346 in FIG. 8. The step S346 and the later steps S347, S345, and S349 select and leave one of the two target models which is in the predetermined stable state. Therefore, it is possible to enhance the reliability of the determination about an objective preceding vehicle. When selection of one of the two target models on the basis of the predetermined stable state is difficult, the program advances from the step S346 to the step S348 in FIG. 8. The step S348 and the later steps S345 and S349 select and leave one of the two target models which relates to a smaller distance deviation. Accordingly, it is possible to enhance the accuracy of the determination about an objective preceding vehicle.

Second Embodiment

A second embodiment of this invention is similar to the first embodiment thereof except that one of two target models which should be merged is selected and left on the basis of one among 1) the lane-sameness probabilities, 2) the predetermined stable state, and 3) the distance deviations.

Third Embodiment

A third embodiment of this invention is similar to the first embodiment thereof except that one of two target models which should be merged is selected and left on the basis of two among 1) the lane-sameness probabilities, 2) the predetermined stable state, and 3) the distance deviations.

Fourth Embodiment

A fourth embodiment of this invention is similar to the first embodiment thereof except for design changes mentioned later. In the fourth embodiment of this invention, the laser radar sensor 5 (see FIG. 1) is modified to cyclically deflect the forward laser beam in both the width-wise direction (the X-axis direction) and the height-wise direction (the Y-axis direction) with respect to the present vehicle to periodically scan a given three-dimensional region in front of the present vehicle. Therefore, the laser radar sensor 5 detects the three-dimensional position (X, Y, Z) of an object in the given three-dimensional region.

The given three-dimensional region corresponds to a three-dimensional detection area monitored by the laser radar sensor 5. The three-dimensional detection area is scanned by the forward laser beam on a line-by-line scanning basis. During every scanning period (every frame period), the direction of the forward laser beam is changed a unit-angle by a unit-angle along the width-wise direction (the X-axis direction) with respect to the present vehicle.

The width-wise unit angle corresponds to, for example, 0.15 degrees. Also, the direction of the forward laser beam is changed a unit-angle by a unit-angle along the height-wise direction (the Y-axis direction) with respect to the present vehicle. The height-wise unit angle corresponds to, for example, 0.7 degrees. The three-dimensional detection area has an angular range of, for example, about 16 degrees which extends in the width-wise direction (the X-axis direction). In this case, the width-wise angular range of the three-dimensional detection area corresponds to 105 image points or pixels (105 multiplied by 0.15 degrees equals about 16 degrees). The three-dimensional detection area has an angular range of, for example, about 4 degrees which extends in the height-wise direction (the Y-axis direction). In this case, the height-wise angular range of the three-dimensional detection area corresponds to 6 lines (6 multiplied by 0.7 degrees equals about 4 degrees). Thus, one frame is composed of 630 image points or pixels (105 image points multiplied by 6 lines).

During every scanning period (every frame period), the three-dimensional detection area is scanned by the forward laser beam along the first scanning line, that is, the uppermost scanning line. Subsequently, the three-dimensional detection area is scanned by the forward laser beam along the second scanning line. Then, the three-dimensional detection area is scanned by the forward laser beam along the third and later scanning lines. Finally, the three-dimensional detection area is scanned by the forward laser beam along the sixth scanning line, that is, the lowermost scanning line. Thus, during every scanning period, the laser radar sensor 5 generates and outputs measurement data corresponding to 630 image points or pixels.

In the fourth embodiment of this invention, the step S2 (see FIG. 3) is modified to implement processes as follows. The step S2 searches the detected point-like object parts for close ones which are spaced by X-axis-direction distances ΔX of 0.2 m or less and Z-axis-direction distances ΔZ of 2 m or less. The step S2 combines or unifies the close point-like object parts into a pre-segment corresponding to a two-dimensional object part. There can be a plurality of pre-segments. The step S2 searches the pre-segments for close ones which are spaced by Y-axis-direction distances ΔY of a predetermined reference value or less. The step S2 combines or unifies the close pre-segments into a segment corresponding to a detected complete object. There can be a plurality of segments.

In the fourth embodiment of this invention, the step S341 (see FIG. 8) is modified to additionally implement the following processes. The step S341 accesses pieces of pre-segment data which correspond to respective target models. The step S341 compares the height-wise positions represented by the pre-segment data pieces. The step S341 determines whether or not two target models should be merged on the basis of the height-wise positions represented by the related pre-segment data pieces. Specifically, the step S341 determines that two target models should be merged when the height-wise positions represented by the related pre-segment data piece are equal to each other.

Fifth Embodiment

A fifth embodiment of this invention is similar to the first embodiment thereof except that the conversion of the distance and angle data of polar coordinates into measurement data of X-Z orthogonal coordinates is implemented by the laser radar sensor 5 instead of the object recognition block 43 provided by the ECU 3.

Sixth Embodiment

A sixth embodiment of this invention is similar to the first embodiment thereof except for a design change mentioned later. The laser radar sensor 5 which employs the laser beam is used as the radar means. In the sixth embodiment of this invention, the radar means is modified to use a radio wave beam, a millimeter wave beam, or an ultrasonic beam. The type of the scanning process by the radar means may differ from that in the first embodiment of this invention. In the case where the radar means uses a Doppler radar or an FMCW radar employing a millimeter wave beam, information of a distance to a preceding vehicle and information of a relative speed of the preceding vehicle are simultaneously derived from an echo wave beam (a return wave beam). Thus, in this case, it is unnecessary to execute a step of calculating a relative speed from distance information.

What is claimed is:

1. A method of recognizing objects located ahead of a vehicle on the basis of reflected waves resulting from a transmission wave emitted ahead of the vehicle within a predetermined angular range, the method comprising the steps of:

calculating positions of the objects;

calculating a lane-sameness probability for each of the objects that the object and the vehicle are on a same lane;

generating object information pieces corresponding to the objects respectively, the object information pieces representing the calculated positions of the objects and the calculated lane-sameness probabilities for the objects;

determining whether or not at least two objects among the objects become substantially equal in position;

in cases where it is determined that at least two objects become substantially equal in position, recognizing the at least two objects as a single object;

selecting one from the at least two objects which relates to a calculated lane-sameness probability equal to or higher than a predetermined value; and causing said single object to take over an object information piece corresponding to the selected object.

2. A method of recognizing objects located ahead of a vehicle on the basis of reflected waves resulting from a transmission wave emitted ahead of the vehicle within a predetermined angular range, the method comprising the steps of:

calculating positions of the objects;

determining whether or not a recognition state of each of the objects is stable;

generating object information pieces corresponding to the objects respectively, the object information pieces representing the calculated positions of the objects and whether or not the recognition states of the objects are stable;

determining whether or not at least two objects among the objects become substantially equal in position;

in cases where it is determined that at least two objects become substantially equal in position, recognizing the at least two objects as a single object;

selecting one from the at least two objects whose recognition state is determined to be stable; and causing said single object to take over the object information piece corresponding to the selected object.

3. A method of recognizing objects located ahead of a vehicle on the basis of reflected waves resulting from a transmission wave emitted ahead of the vehicle within a predetermined angular range, the method comprising the steps of:

periodically calculating positions of the objects;

estimating current positions of the objects on the basis of previously calculated positions thereof;

calculating deviations between the estimated current positions of the objects and currently calculated positions thereof;

generating object information pieces corresponding to the objects respectively, the object information pieces representing the calculated positions of the objects and the calculated deviations related to the objects;

determining whether or not at least two objects among the objects become substantially equal in position;

in cases where it is determined that at least two objects become substantially equal in position, recognizing the at least two objects as a single object;

selecting one from the at least two objects which relates to a smallest calculated deviation; and causing said single object to take over the object information piece corresponding to the selected object.

4. An object recognition apparatus comprising:

radar means for applying a transmission wave to a predetermined angular range in a direction ahead of a vehicle, and detecting reflected waves which result from reflections of the transmission wave; and recognizing means for recognizing objects located ahead of the vehicle on the basis of results of the detecting by the radar means;

wherein the recognizing means comprises:
1) first means for calculating positions of the recognized objects;
2) second means for determining whether or not a recognition state of each of the recognized objects is stable;
3) third means for generating object information pieces corresponding to the recognized objects respectively, the object information pieces representing the calculated positions of the recognized objects and whether or not the recognition states of the recognized objects are stable;
4) fourth means for determining whether or not at least two objects among the recognized objects become substantially equal in position;
5) fifth means for, in cases where the fourth means determines that at least two objects become substantially equal in position, recognizing the at least two objects as a single object;
6) sixth means for selecting one from the at least two objects whose recognition state is determined to be stable; and
7) seventh means for causing said single object to take over the object information piece corresponding to the object selected by the sixth means.

5. An object recognition apparatus as recited in claim 4, wherein the recognizing means further comprises:

eighth means for determining whether or not a recognition state of each of the recognized objects is stable;

ninth means for adding results of the determining by the eighth means to the object information pieces;

tenth means for, either in cases where a plurality of objects among the at least two objects relate to calculated lane-sameness probabilities equal to or higher than the predetermined value or in cases where a plurality of objects among the at least two objects relate to calculated lane-sameness probabilities less than the predetermined value, selecting one from the at least two objects whose recognition state is determined to be stable; and eleventh means for causing said single object to take over the object information piece corresponding to the object selected by the tenth means.

6. An object recognition apparatus as recited in claim 4, wherein the recognizing means further comprises:

eighth means for estimating current positions of the recognized objects on the basis of previously calculated positions thereof;

ninth means for calculating deviations between the estimated current positions of the recognized objects and currently calculated positions thereof;

tenth means for adding the deviations calculated by the ninth means to the object information pieces;

eleventh means for, either in cases where a plurality of objects among the at least two objects relate to calculated lane-sameness probabilities equal to or higher than the predetermined value or in cases where a plurality of objects among the at least two objects relate to calculated lane-sameness probabilities less than the predetermined value, selecting one from the at least two objects which relates to a smallest calculated deviation; and twelfth means for causing said single object to take over the object information piece corresponding to the object selected by the eleventh means.

7. An object recognition apparatus as recited in claim 4, wherein the recognizing means further comprises:

eighth means for determining whether or not a recognition state of each of the recognized objects is stable;

ninth means for adding results of the determining by the eighth means to the object information pieces;

tenth means for estimating current positions of the recognized objects on the basis of previously calculated positions thereof;

eleventh means for calculating deviations between the estimated current positions of the recognized objects and currently calculated positions thereof;

twelfth means for adding the deviations calculated by the eleventh means to the object information pieces;

thirteenth means for, either in cases where a plurality of objects among the at least two objects relate to calculated lane-sameness probabilities equal to or higher than the predetermined value and only one of the at least two objects has a recognition state determined to be stable or in cases where a plurality of objects among the at least two objects relate to calculated lane-sameness probabilities less than the predetermined value and only one of the at least two objects has a recognition state determined to be stable, selecting one from the at least two objects whose recognition state is determined to be stable;

fourteenth means for causing said single object to take over the object information piece corresponding to the object selected by the thirteenth means;

fifteenth means for, either in cases where a plurality of objects among the at least two objects relate to calculated lane-sameness probabilities equal to or higher than the predetermined value and two or more of the at least two objects have recognition states determined to be stable or in cases where a plurality of objects among the at least two objects relate to calculated lane-sameness probabilities less than the predetermined value and two or more of the at least two objects have recognition states determined to be stable, selecting one from the at least two objects which relates to a smallest calculated deviation; and sixteenth means for causing said single object to take over the object information piece corresponding to the object selected by the fifteenth means.

8. An object recognition apparatus comprising:

radar means for emitting a transmission wave within a predetermined range of directions ahead of a vehicle, and detecting reflected waves which result from reflections of the transmission wave; and recognizing means for recognizing objects located ahead of the vehicle on the basis of results of the detecting by the radar means;

wherein the recognizing means comprises:
1) first means for calculating positions of the recognized objects;
2) second means for calculating a lane-sameness probability for each of the recognized objects that the object and the vehicle are on a same lane;
3) third means for generating object information pieces corresponding to the recognized objects respectively, the object information pieces representing the calculated positions of the recognized objects and the calculated lane-sameness probabilities for the recognized objects;
4) fourth means for determining whether or not at least two objects among the recognized objects become substantially equal in position;
5) fifth means for, in cases where the fourth means determines that at least two objects become substantially equal in position, recognizing the at least two objects as a single object;
6) sixth means for selecting one from the at least two objects which relates to a calculated lane-sameness probability equal to or higher than a predetermined value; and
7) seventh means for causing said single object to take over an object information piece corresponding to the object selected by the sixth means.

9. An object recognition apparatus as recited in claim 8, wherein the recognizing means further comprises:

eighth means for estimating current positions of the recognized objects on the basis of previously calculated positions there of;

ninth means for calculating deviations between the estimated current positions of the recognized objects and currently calculated positions thereof;

tenth means for adding the deviations calculated by the ninth means to the object information pieces;

eleventh means for, either in cases where a plurality of objects among the at least two objects relate to calculated lane-sameness probabilities equal to or higher than the predetermined value and two or more of the at least two objects have recognition states determined to be stable or in cases where a plurality of objects among the at least two objects relate to calculated lane-sameness probabilities less than the predetermined value and two or more of the at least two objects have recognition states determined to be stable, selecting one from the at least two objects which relates to a smallest calculated deviation; and twelfth means for causing said single object to take over the object information piece corresponding to the object selected by the eleventh means.

10. An object recognition apparatus as recited in claim 8, wherein the second means in the recognizing means comprises means for calculating an acceleration of each of the recognized objects relative to the vehicle, means for judging whether or not the calculated acceleration is in a predetermined range hardly occurring under usual traffic conditions, means for, when the calculated acceleration is judged to be in the predetermined range, determining that a recognized state of the related object is not stable, and means for, when the calculated acceleration is judged to be not in the predetermined range, determining that a recognition state of the related object is stable.

11. An object recognition apparatus comprising:

radar means for emitting a transmission wave within a predetermined range of directions ahead of a vehicle, and detecting reflected waves which result from reflections of the transmission wave; and recognizing means for recognizing objects located ahead of the vehicle on the basis of results of the detecting by the radar means;

wherein the recognizing means comprises:
1) first means for periodically calculating positions of the recognized objects;
2) second means for estimating current positions of the recognized objects on the basis of the previously calculated positions thereof;
3) third means for generating object information pieces corresponding to the recognized objects respectively, the object information pieces representing the calculated positions of the recognized objects and whether or not the recognition states of the recognized objects are stable;
4) fourth means for generating object information pieces corresponding to the recognized objects respectively, the object information pieces representing the calculated positions of the recognized objects and the calculated deviations related to the recognized objects;
5) fifth means for determining whether or not at least two objects among the recognized objects become substantially equal in position;

6) sixth means for, in cases where the fifth means determines that at least two objects become substantially equal in position, recognizing the at least two objects as a single object;

7) seventh means for selecting one from the at least two object which relates to a smallest calculated deviation; and 8) eighth means for causing said single object to take over the object information piece corresponding to the object selected by the seventh means.

12. A recording medium storing a program for controlling a computer to recognize objects located ahead of a vehicle based on reflected radar waves, the computer operating as a recognizing means comprising:

first means for calculating positions of the recognized objects;

second means for determining whether or not a recognition state of each of the recognized objects is stable;

third means for generating object information pieces corresponding to the recognized objects respectively, the object information pieces representing the calculated positions of the recognized objects and whether or not the recognition states of the recognized objects are stable;

fourth means for determining whether or not at least two objects among the recognized objects become substantially equal in position;

fifth means for, in cases where the fourth means determines that at least two objects become substantially equal in position, recognizing the at least two objects as a single object;

sixth means for selecting one from the at least two objects whose recognition state is determined to be stable; and seventh means for causing said single object to take over the object information piece corresponding to the object selected by the sixth means.

13. The recording medium storing a program for controlling a computer to recognize objects located ahead of a vehicle based on reflected radar waves as recited in claim 12, wherein the recognizing means further comprises;

eighth means for determining whether or not a recognition state of each of the recognized objects is stable;

ninth means for adding results of the determining by the eighth means to the object information pieces;

tenth means for, either in cases where a plurality of objects among the at least two objects relate to calculated lane-sameness probabilities equal to or higher than the predetermined value or in cases where plurality of objects among the at least two objects relate to calculated lane-sameness probabilities less than the predetermined valued, selecting one from the at least two objects whose recognition state is determined to be stable; and eleventh means for causing said single object to take over the object information piece corresponding to the object selected by the tenth means.

14. The recording medium storing a program for controlling a computer to recognize objects located ahead of a vehicle based on reflected radar waves as recited in claim 12, wherein the recognizing means further comprises:

eighth means for estimating current positions of the recognized objects on the basis of previously calculated positions thereof;

ninth means for calculating deviations between the estimated current positions of the recognized objects and currently calculated positions thereof;

tenth means for adding the deviations calculated by the ninth means to the object information pieces;

eleventh means for, either in cases where a plurality of objects among the at least two objects relate to calculated lane-sameness probabilities equal to or higher than the predetermined value or in cases where a plurality of objects among the at least two objects which relates to a smallest calculated deviation; and twelfth means for causing said single object to take over the object information piece corresponding to the object selected by the eleventh means.

15. The recording medium storing a program for controlling a computer to recognize objects located ahead of a vehicle based on reflected radar waves as recited in claim 12, wherein the recognizing means further comprises:

eighth means for determining whether or not a recognition sate of each of the recognized objects is stable;

ninth means for adding results of the determining by the eighth means to the object information pieces;

tenth means for estimating current positions of the recognized objects on the basis of previously calculated positions thereof;

eleventh means for calculating deviations between the estimated current positions of the recognized objects and currently calculated positions thereof;

twelfth means for adding the deviations calculated by the eleventh means to the object information pieces;

thirteenth means for, either in cases where a plurality of objects among the at least two objects relate to calculated lane-sameness probabilities equal to or higher than the predetermined value and only one of the at least two objects has recognition state determined to be stable, selecting one from the at least two objects whose recognition state is determined to be stable;

fourteenth means for causing said single object to take over the object information piece corresponding to the object selected by the thirteenth means;

fifteenth means for, either in cases where a plurality of objects among the at least two objects relate to calculated lane-sameness probabilities equal to or higher than the predetermined value and two or more of the least two objects have recognition states determined to be stable or in cases where a plurality of objects among the at least two objects relate to calculated lane-sameness probabilities less than the predetermined value and two or more of the at least two objects have recognition states determined to be stable, selection one from the at least two objects which relates to a smallest calculated deviation; and sixteenth means for causing said single object to take over the object information piece corresponding to the object selected by the fifteenth means.

16. The recording medium storing a program for controlling a computer to recognize objects located ahead of a vehicle based on reflected radar waves as recited in claim 12, wherein the second means in the recognizing means comprises:

means for calculating an acceleration of each of the recognized objects relative to the vehicle, means for judging whether or not the calculated acceleration is in a predetermined range hardly occurring under usual traffic conditions, means for, when the calculated acceleration is judged to be in the predetermined range, determining that a recognized state of the related object is not stable, and means for, when the calculated acceleration is judged to be not in the predetermined range, determining that a recognition state of the related object is stable.

* * * * *